(12) United States Patent
Ashton-Patton et al.

(10) Patent No.: US 11,746,038 B2
(45) Date of Patent: Sep. 5, 2023

(54) HIGH TRANSMISSION GLASSES

(71) Applicant: CORNING INCORPORATED, Corning, NY (US)

(72) Inventors: Melissann Marie Ashton-Patton, Corning, NY (US); Adam James Ellison, Corning, NY (US); Ellen Anne King, Corning, NY (US)

(73) Assignee: Corning Incorporated, Corning, NY (US)

( * ) Notice: Subject to any disclaimer, the term of this patent is extended or adjusted under 35 U.S.C. 154(b) by 155 days.

(21) Appl. No.: 17/347,968

(22) Filed: Jun. 15, 2021

(65) Prior Publication Data

US 2021/0317031 A1    Oct. 14, 2021

Related U.S. Application Data

(63) Continuation of application No. 16/498,652, filed as application No. PCT/US2018/024759 on Mar. 28, 2018, now Pat. No. 11,040,907.

(60) Provisional application No. 62/479,497, filed on Mar. 31, 2017.

(51) Int. Cl.
| | |
|---|---|
| *C03C 3/087* | (2006.01) |
| *C03C 3/093* | (2006.01) |
| *C03C 4/00* | (2006.01) |
| *F21V 8/00* | (2006.01) |

(52) U.S. Cl.
CPC .............. *C03C 3/087* (2013.01); *C03C 3/093* (2013.01); *C03C 4/0092* (2013.01); *G02B 6/0065* (2013.01); *G02B 6/0088* (2013.01)

(58) Field of Classification Search
CPC ......... C03C 3/087; C03C 3/093; C03C 3/089; C03C 3/091; C03C 4/0092
See application file for complete search history.

(56) References Cited

U.S. PATENT DOCUMENTS

| | | | |
|---|---|---|---|
| 3,499,775 | A | 3/1970 | Albinak et al. |
| 3,811,853 | A | 5/1974 | Bartholomew et al. |
| 4,116,704 | A | 9/1978 | Boyd et al. |
| 4,194,807 | A | 3/1980 | Gliemeroth |

(Continued)

FOREIGN PATENT DOCUMENTS

| | | |
|---|---|---|
| CN | 103663962 A | 3/2014 |
| CN | 105916825 A | 8/2016 |

(Continued)

OTHER PUBLICATIONS

International Search Report and Written Opinion of the International Searching Authority; PCT/US2018/024759; dated Nov. 9, 2018; 16 Pages; European Patent Office.

(Continued)

*Primary Examiner* — Noah S Wiese
(74) *Attorney, Agent, or Firm* — Ryan T. Hardee

(57) ABSTRACT

Compounds, compositions, articles, devices, and methods for the manufacture of light guide plates and back light units including such light guide plates made from glass. In some embodiments, light guide plates (LGPs) are provided that have similar or superior optical properties to light guide plates made from PMMA and that have exceptional mechanical properties such as rigidity, CTE and dimensional stability in high moisture conditions as compared to PMMA light guide plates.

20 Claims, 3 Drawing Sheets

(56) References Cited

U.S. PATENT DOCUMENTS

| | | | |
|---|---|---|---|
| 4,565,791 A | 1/1986 | Boudot et al. | |
| 5,145,805 A | 9/1992 | Tarumi et al. | |
| 5,242,869 A | 9/1993 | Tarumi et al. | |
| 5,256,601 A | 10/1993 | Kerko et al. | |
| 5,557,171 A | 9/1996 | Marlor et al. | |
| 5,612,262 A | 3/1997 | Kloss et al. | |
| 5,895,719 A | 4/1999 | Fyles et al. | |
| 6,118,216 A | 9/2000 | Marlor | |
| 6,812,175 B2 | 11/2004 | Kawase et al. | |
| 6,818,577 B2 | 11/2004 | Anma et al. | |
| 7,217,673 B2 | 5/2007 | Naumann et al. | |
| 7,375,043 B2 | 5/2008 | Fechner et al. | |
| 7,760,977 B2 | 7/2010 | Curdt et al. | |
| 8,039,410 B2 | 10/2011 | Kolberg et al. | |
| 8,093,793 B2 | 1/2012 | Hoshimure et al. | |
| 8,283,269 B2 | 10/2012 | Fechner et al. | |
| 8,802,581 B2 | 8/2014 | Dejneka et al. | |
| 8,980,777 B2 | 3/2015 | Danielson et al. | |
| 9,034,442 B2 | 5/2015 | Chang et al. | |
| 9,145,329 B2 | 9/2015 | Drake et al. | |
| 9,831,392 B2 | 11/2017 | Shiratori et al. | |
| 9,902,644 B2 | 2/2018 | Ellison et al. | |
| 2003/0147157 A1 | 8/2003 | Kamimura et al. | |
| 2005/0148454 A1 | 7/2005 | Hachitani | |
| 2007/0200097 A1 | 8/2007 | Kishimoto et al. | |
| 2009/0141478 A1 | 6/2009 | Niguma et al. | |
| 2010/0093510 A1 | 4/2010 | Tanaka et al. | |
| 2010/0300535 A1 | 12/2010 | Aitken et al. | |
| 2010/0300536 A1 | 12/2010 | Aitken et al. | |
| 2013/0101596 A1 | 4/2013 | Demartino et al. | |
| 2013/0302617 A1 | 11/2013 | Akiba et al. | |
| 2015/0368146 A1* | 12/2015 | Ellison | G02B 6/0065 501/71 |
| 2017/0022092 A1 | 1/2017 | Demartino et al. | |
| 2017/0052311 A1 | 2/2017 | Lautenschlager et al. | |
| 2017/0121215 A1 | 5/2017 | Matsuo et al. | |
| 2018/0305240 A1 | 10/2018 | Ashton-Patton et al. | |
| 2019/0185367 A1 | 6/2019 | Kuchinsky et al. | |
| 2019/0256403 A1 | 8/2019 | Lonnroth | |

FOREIGN PATENT DOCUMENTS

| | | | |
|---|---|---|---|
| CN | 106348587 A | 1/2017 | |
| DE | 10025465 A1 | 8/2002 | |
| EP | 1288170 A1 | 3/2003 | |
| JP | 54-113618 A | 9/1979 | |
| JP | 55-007548 A | 1/1980 | |
| JP | 57-160938 A | 4/1982 | |
| JP | 58-145637 A | 8/1983 | |
| JP | 60-056467 A | 4/1985 | |
| JP | 62-187141 A | 8/1987 | |
| JP | 64-087529 A | 3/1989 | |
| JP | 04-219343 A | 8/1992 | |
| JP | 09-124340 A | 5/1997 | |
| JP | 10-095633 A | 4/1998 | |
| JP | 11-240735 A | 9/1999 | |
| JP | 2001-089185 A | 4/2001 | |
| JP | 2002-173335 A | 6/2002 | |
| JP | 2003-095692 A | 4/2003 | |
| JP | 2004-315279 A | 11/2004 | |
| JP | 2004-315280 A | 11/2004 | |
| JP | 2005-037651 A | 2/2005 | |
| JP | 2005-267974 A | 9/2005 | |
| JP | 2007-039281 A | 2/2007 | |
| JP | 2010-138063 A | 6/2010 | |
| JP | 5051329 B2 | 10/2012 | |
| JP | 2012-528071 A | 11/2012 | |
| JP | 2015-501280 A | 1/2015 | |
| JP | 2015-502899 A | 1/2015 | |
| JP | 2016-518304 A | 6/2016 | |
| KR | 10-2012-0026113 A | 3/2012 | |
| KR | 10-2017-0018443 A | 2/2017 | |
| RU | 2035414 C1 | 5/1995 | |
| SU | 563370 A1 | 6/1977 | |
| SU | 808395 A1 | 2/1981 | |
| SU | 1604764 A | 11/1990 | |
| TW | 201317190 A | 5/2013 | |
| TW | 201602037 A | 1/2016 | |
| WO | WO-2010138784 A2 * | 12/2010 | ............. C03C 3/064 |
| WO | 2011/152414 A1 | 12/2011 | |
| WO | 2013/063002 A2 | 5/2013 | |
| WO | 2015/195435 A2 | 12/2015 | |
| WO | 2016/017558 A1 | 2/2016 | |
| WO | 2017/070066 A1 | 4/2017 | |
| WO | 2017/139552 A1 | 8/2017 | |
| WO | 2018/031892 A1 | 2/2018 | |
| WO | 2018/053078 A1 | 3/2018 | |

OTHER PUBLICATIONS

Singapore Search Report and Written Opinion; 11201909084S; dated Oct. 29, 2020; 10 Pages; Singapore Patent Office.

Japanese Patent Application No. 2019-553491, Office Action dated Jan. 17, 2022, 16 pages (8 pages of English Translation and 8 pages of Original Document), Japanese Patent Office.

Chinese Patent Application No. 201880033698.3, Office Action dated Sep. 1, 2021, 11 pages (5 pages of English Translation and 6 pages of Original Document), Chinese Patent Office.

Taiwanese Patent Application No. 107111152, Office Action dated Aug. 13, 2021, 2 pages (English Translation Only); Taiwanese Patent Office.

Korean Patent Application No. 10-2019-7031861, Office Action dated Nov. 23, 2022, 8 pages ( English translation only), Korean Patent Office.

Korean Patent Application No. 10-2019-7031861, Notice of Allowance, dated Apr. 18, 2023, 6 pages (3 pages of English Translation and 3 pages of Original Copy); Korean Patent Office.

* cited by examiner

HIGH TRANSMISSION GLASSES

CROSS-REFERENCE TO RELATED APPLICATION

This application is a continuation and claims the benefit of priority under 35 U.S.C. § 120 of U.S. application Ser. No. 16/498,652 filed on Sep. 27, 2019, which in turn, claims the benefit of priority under 35 U.S.C. § 371 of International Application Serial No. PCT/US2018/024759 filed on Mar. 28, 2018, which in turn, claims the benefit of priority under 35 U.S.C. § 119 of U.S. Provisional Application Ser. No. 62/479,497 filed on Mar. 31, 2017, the content of which is relied upon and incorporated herein by reference in its entirety.

BACKGROUND

Side lit back light units include a light guide plate (LGP) that is usually made of high transmission plastic materials such as polymethylmethacrylate (PMMA). Although such plastic materials present excellent properties such as light transmission, these materials exhibit relatively poor mechanical properties such as rigidity, coefficient of thermal expansion (CTE) and moisture absorption.

Accordingly, it would be desirable to provide an improved light guide plate having attributes that achieve an improved optical performance in terms of light transmission, solarization, scattering and light coupling as well as exhibiting exceptional mechanical performance in terms of rigidity, CTE, and moisture absorption.

SUMMARY

Aspects of the subject matter pertain to compounds, compositions, articles, devices, and methods for the manufacture of light guide plates and back light units including such light guide plates made from glass. In some embodiments, light guide plates (LGPs) are provided that have similar or superior optical properties to light guide plates made from PMMA and that have exceptional mechanical properties such as rigidity, CTE and dimensional stability in high moisture conditions as compared to PMMA light guide plates.

Principles and embodiments of the present subject matter relate in some embodiments to a light guide plate for use in a backlight unit. In some embodiments the glass article or light guide plate (in some examples) can comprise a glass sheet with a front face having a width and a height, a back face opposite the front face, and a thickness between the front face and back face, forming four edges around the front and back faces, wherein the glass sheet comprises between about 70 mol % to about 85 mol % $SiO_2$, between about 0 mol % to about 5 mol % $Al_2O_3$, between about 0 mol % to about 5 mol % $B_2O_3$, between about 0 mol % to about 10 mol % $Na_2O$, between about 0 mol % to about 12 mol % $K_2O$, between about 0 mol % to about 4 mol % ZnO, between about 3 mol % to about 12 mol % MgO, between about 0 mol % to about 5 mol % CaO, between about 0 mol % to about 3 mol % SrO, between about 0 mol % to about 3 mol % BaO, and between about 0.01 mol % to about 0.5 mol % $SnO_2$.

In other embodiments, the glass article can comprise a glass sheet with a front face having a width and a height, a back face opposite the front face, and a thickness between the front face and back face forming four edges around the front and back faces, wherein the glass sheet comprises greater than about 80 mol % $SiO_2$, between about 0 mol % to about 0.5 mol % $Al_2O_3$, between about 0 mol % to about 0.5 mol % $B_2O_3$, between about 0 mol % to about 0.5 mol % $Na_2O$, between about 8 mol % to about 11 mol % $K_2O$, between about 0.01 mol % to about 4 mol % ZnO, between about 6 mol % to about 10 mol % MgO, between about 0 mol % to about 0.5 mol % CaO, between about 0 mol % to about 0.5 mol % SrO, between about 0 mol % to about 0.5 mol % BaO, and between about 0.01 mol % to about 0.11 mol % $SnO_2$.

In further embodiments, the glass article can comprise a glass sheet with a front face having a width and a height, a back face opposite the front face, and a thickness between the front face and back face forming four edges around the front and back faces, wherein the glass sheet is substantially free of $Al_2O_3$ and $B_2O_3$ and comprises greater than about 80 mol % $SiO_2$, between about 0 mol % to about 0.5 mol % $Na_2O$, between about 8 mol % to about 11 mol % $K_2O$, between about 0.01 mol % to about 4 mol % ZnO, between about 6 mol % to about 10 mol % MgO, and between about 0.01 mol % to about 0.11 mol % $SnO_2$. In some embodiments, the glass sheet is substantially free of $B_2O_3$, $Na_2O$, CaO, SrO, or BaO, and combinations thereof.

In additional embodiments, the glass article can comprise a glass sheet with a front face having a width and a height, a back face opposite the front face, and a thickness between the front face and back face forming four edges around the front and back faces, wherein the glass sheet comprises an alumina free, potassium silicate composition comprising greater than about 80 mol % $SiO_2$, between about 8 mol % to about 11 mol % $K_2O$, between about 0.01 mol % to about 4 mol % ZnO, between about 6 mol % to about 10 mol % MgO, and between about 0.01 mol % to about 0.11 mol % $SnO_2$. In some embodiments, the glass sheet is substantially free of $B_2O_3$, $Na_2O$, CaO, SrO, or BaO, and combinations thereof.

In some embodiments, the glass article can comprise a glass sheet with a front face having a width and a height, a back face opposite the front face, and a thickness between the front face and back face forming four edges around the front and back faces, wherein the glass sheet comprises between about 72.82 mol % to about 82.03 mol % $SiO_2$, between about 0 mol % to about 4.8 mol % $Al_2O_3$, between about 0 mol % to about 2.77 mol % $B_2O_3$, between about 0 mol % to about 9.28 mol % $Na_2O$, between about 0.58 mol % to about 10.58 mol % $K_2O$, between about 0 mol % to about 2.93 mol % ZnO, between about 3.1 mol % to about 10.58 mol % MgO, between about 0 mol % to about 4.82 mol % CaO, between about 0 mol % to about 1.59 mol % SrO, between about 0 mol % to about 3 mol % BaO, and between about 0.08 mol % to about 0.15 mol % $SnO_2$. In further embodiments, the glass sheet is substantially free of $Al_2O_3$, $B_2O_3$, $Na_2O$, CaO, SrO, or BaO, and combinations thereof.

In further embodiments, the glass article can comprise a glass sheet with a front face having a width and a height, a back face opposite the front face, and a thickness between the front face and back face forming four edges around the front and back faces, wherein the glass sheet is substantially free of $Al_2O_3$ and $B_2O_3$ and comprises greater than about 80 mol % $SiO_2$, and wherein the glass has a color shift <0.005. In some embodiments, the glass sheet comprises between about 8 mol % to about 11 mol % $K_2O$, between about 0.01 mol % to about 4 mol % ZnO, between about 6 mol % to about 10 mol % MgO, and between about 0.01 mol % to about 0.11 mol % $SnO_2$.

In additional embodiments, the glass article can comprise a glass sheet with a front face having a width and a height, a back face opposite the front face, and a thickness between the front face and back face forming four edges around the front and back faces, wherein the glass sheet is substantially free of $Al_2O_3$, $B_2O_3$, $Na_2O$, CaO, SrO, and BaO, and wherein the glass has a color shift <0.005. In some embodiments, the glass sheet comprises greater than about 80 mol % $SiO_2$. In some embodiments, the glass sheet comprises between about 8 mol % to about 11 mol % $K_2O$, between about 0.01 mol % to about 4 mol % ZnO, between about 6 mol % to about 10 mol % MgO, and between about 0.01 mol % to about 0.11 mol % $SnO_2$.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings.

DETAILED DESCRIPTION

Described herein are light guide plates, methods of making light guide plates and backlight units utilizing light guide plates in accordance with embodiments of the present invention.

Current light guide plates used in LCD backlight applications are typically made from PMMA material since this is one of the best materials in term of optical transmission in the visible spectrum. However, PMMA presents mechanical problems that make large size (e.g., 50 inch diagonal and greater) displays challenging in term of mechanical design, such as, rigidity, moisture absorption, and coefficient of thermal expansion (CTE).

Exemplary LGPs made from glass, however, have an advantage over those made from plastics such as PMMA due to the increased rigidity, better moisture absorption, and low CTE of glass. Exemplary LGPs according to the instant disclosure can provide a tunable color shift as a function of the glass composition. For exemplary glass light-guide plates the color shift Δy can be reported as $\Delta y = y(L_2) - y(L_1)$ where $L_2$ and $L_1$ are Z positions along the panel or substrate direction away from the source launch (e.g., LED or otherwise) and where $L_2 - L_1 = 0.5$ meters, wherein smaller differences between point 1 and point 2 translate to less color shift in the respective LGP. To achieve a low color shift, an exemplary LGP absorption curve should take on a certain shape, e.g., blue absorption at 450 nm should be lower than red absorption at 630 nm. Thus, the lower the blue absorption is relative to the red absorption, the lower the color shift in the LGP. Control of optical absorption in exemplary embodiments, specifically, that of Cr and Ni can be achieved by manipulating the optical basicity of the glass.

With regard to rigidity, conventional LCD panels are made of two pieces of thin glass (color filter substrate and TFT substrate) with a PMMA light guide and a plurality of thin plastic films (diffusers, dual brightness enhancement films (DBEF) films, etc.). Due to the poor elastic modulus of PMMA, the overall structure of the LCD panel does not have sufficient rigidity, and additional mechanical structure is necessary to provide stiffness for the LCD panel. It should be noted that PMMA generally has a Young's modulus of about 2 GPa, while certain exemplary glasses have a Young's modulus ranging from about 60 GPa to 90 GPa or more.

Figure 2:
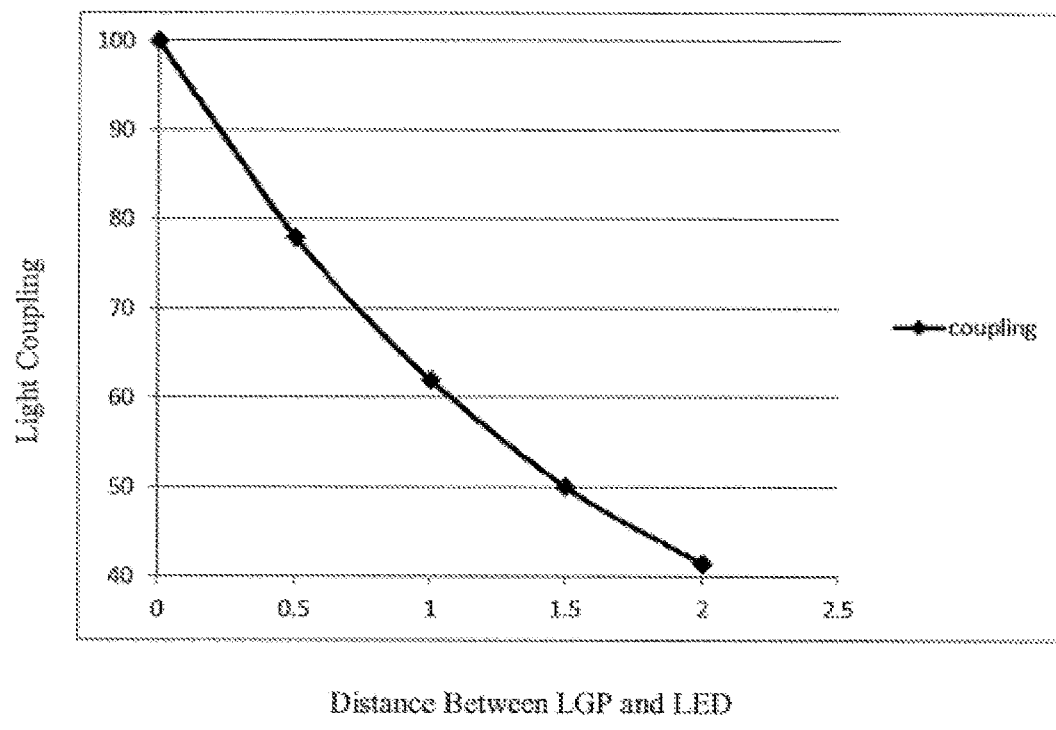
FIG. 2 is a graph showing percentage light coupling versus distance between an LED and LGP edge.

Regarding moisture absorption, humidity testing shows that PMMA is sensitive to moisture and size can change by about 0.5%. For a PMMA panel having a length of one meter, this 0.5% change can increase the length by 5 mm, which is significant and makes the mechanical design of a corresponding backlight unit challenging. Conventional means to solve this problem is leaving an air gap between the light emitting diodes (LEDs) and the PMMA light guide plate (LGP) to let the material expand. A problem with this approach is that light coupling is extremely sensitive to the distance from the LEDs to the LGP, which can cause the display brightness to change as a function of humidity. FIG. 2 is a graph showing percentage light coupling versus distance between an LED and LGP edge. With reference to FIG. 2, a relationship is shown which illustrates the drawbacks of conventional measures to solve challenges with PMMA. More specifically, FIG. 2 illustrates a plot of light coupling versus LED to LGP distance assuming both are 2 mm in height. It can be observed that the further the distance between LED and LGP, a less efficient light coupling is made between the LED and LGP.

With regard to CTE, the CTE of PMMA is about 75E-6 $C^{-1}$ and has relatively low thermal conductivity (0.2 W/m/K) while some glasses have a CTE of about 8E-6 $C^{-1}$ and a thermal conductivity of 0.8 W/m/K. Of course, the CTE of other glasses can vary and such a disclosure should not limit the scope of the claims appended herewith. PMMA also has a transition temperature of about 105° C., and when used an LGP, a PMMA LGP material can become very hot whereby its low conductivity makes it difficult to dissipate heat. Accordingly, using glass instead of PMMA as a material for light guide plates provides benefits in this regard, but conventional glass has a relatively poor transmission compared to PMMA due mostly to iron and other impurities. Also some other parameters such as surface roughness, waviness, and edge quality polishing can play a significant role on how a glass light guide plate can perform.

In exemplary embodiments, a LGP can be positioned between layers of optical films (e.g., diffuser, DBEF, etc.) on the front face thereof and a reflector film or other reflector features (e.g., lenticulars, quantum dots etc.) on the back face thereof. The reflector films direct light from the vertical plane of the LGP towards an LCD, and the optical films condition the light for the LCD. When white light interacts with both these layers and the LGP, some light may be lost to scattering and absorption. This loss leads to color shift and/or a decrease in brightness. The magnitude of the color shift seen in the LGP can be dictated by the shape of its absorption curve over the visible spectrum, which in turn can be dictated by the base glass matrix, the concentration of tramp metals, and the tramp metal redox state within the LGP.

The cost associated with manufacturing LGPs can be dependent upon the glass composition. For example, while melting process parameters can be manipulated to shift the optical absorption demonstrated by a particular glass composition, this cannot be used to completely remove the tramp metal absorption from the visible portion of the spectrum. Additionally, the cost of high purity raw materials (those that are processed to contain very low amounts of tramp metals) are in some cases up to eight times more expensive than standard raw materials. For this reason, it is important to design glass compositions that minimize the use of the most expensive raw materials. Conventional glass LGPs have utilized compositions in the sodium aluminosilicate composition space. However, the cost of such compositions are somewhat prohibitive to profitability and thus exemplary compositions described herein include alumina free, potassium silicate compositions to enable lower cost LGPs.

Figure 1:
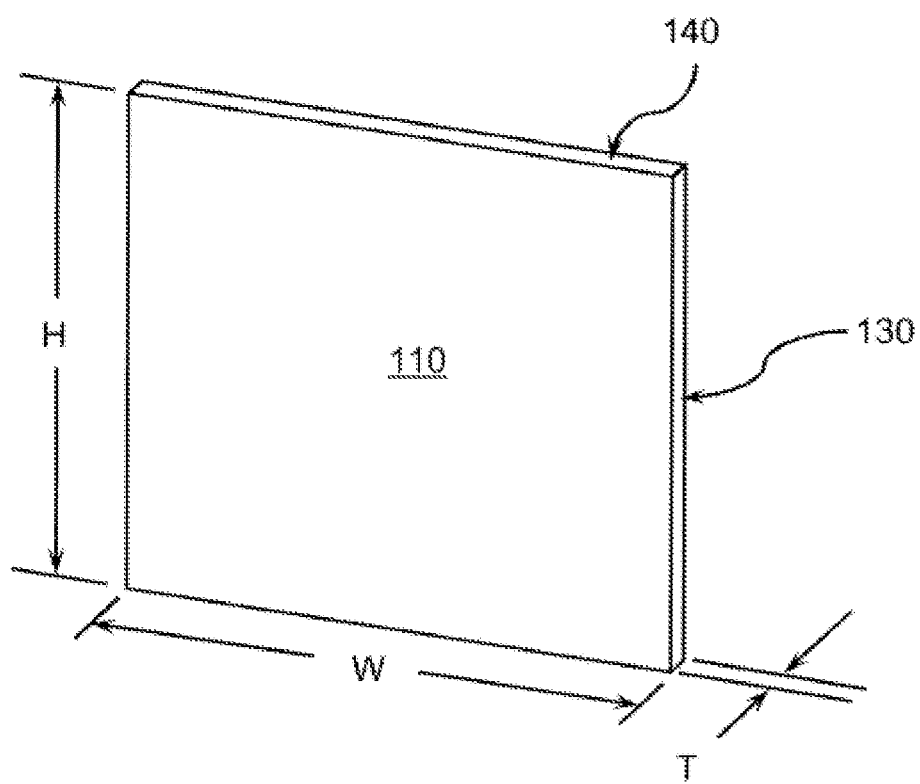
FIG. 1 is a pictorial illustration of an exemplary embodiment of a light guide plate.

FIG. 1 is a pictorial illustration of an exemplary embodiment of a light guide plate. With reference to FIG. 1, an illustration is provided of an exemplary embodiment having a shape and structure of an exemplary light guide plate comprising a sheet of glass 100 having a first face 110, which may be a front face, and a second face opposite the first face, which may be a back face. The first and second faces may have a height, H, and a width, W. The first and/or second face(s) may have a roughness that is less than 0.6 nm, less than 0.5 nm, less than 0.4 nm, less than 0.3 nm, less than 0.2 nm, less than 0.1 nm, or between about 0.1 nm and about 0.6 nm.

The glass sheet may have a thickness, T, between the front face and the back face, where the thickness forms four edges. The thickness of the glass sheet may be less than the height and width of the front and back faces. In various embodiments, the thickness of the plate may be less than 1.5% of the height of the front and/or back face. Alternatively, the thickness, T, may be less than about 3 mm, less than about 2 mm, less than about 1 mm, or between about 0.1 mm to about 3 mm. The height, width, and thickness of the light guide plate may be configured and dimensioned for use in an LCD backlight application.

A first edge 130 may be a light injection edge that receives light provided for example by a light emitting diode (LED). The light injection edge may scatter light within an angle less than 12.8 degrees full width half maximum (FWHM) in transmission. The light injection edge may be obtained by grinding the edge without polishing the light injection edge. The glass sheet may further comprise a second edge 140 adjacent to the light injection edge and a third edge opposite the second edge and adjacent to the light injection edge, where the second edge and/or the third edge scatter light within an angle of less than 12.8 degrees FWHM in reflection. The second edge 140 and/or the third edge may have a diffusion angle in reflection that is below 6.4 degrees. It should be noted that while the embodiment depicted in FIG. 1 shows a single edge 130 injected with light, the claimed subject matter should not be so limited as any one or several of the edges of an exemplary embodiment 100 can be injected with light. For example, in some embodiments, the first edge 130 and its opposing edge can both be injected with light. Such an exemplary embodiment may be used in a display device having a large and or curvilinear width W. Additional embodiments may inject light at the second edge 140 and its opposing edge rather than the first edge 130 and/or its opposing edge. Thicknesses of exemplary display devices can be less than about 10 mm, less than about 9 mm, less than about 8 mm, less than about 7 mm, less than about 6 mm, less than about 5 mm, less than about 4 mm, less than about 3 mm, or less than about 2 mm.

Generally, LGPs use either white light LEDs or blue light LEDs. The presence of transition metals in the glass causes the formation of absorption bands in the visible light region. These absorption bands can result in a decrease in the amount of light passing through the glass (a viewer would perceive this as a decrease in LCD screen brightness) and result in an increase in color shift. Thus, exemplary embodiments can maximize brightness and minimize color shift by controlling transition metals including iron, nickel and chromium (each of which are particularly damaging to the transmission of glass and increase color shift due to the location of the bands and the absorption coefficients (intensity) of these bands). Exemplary embodiments described herein, however, minimize the effect of these absorption bands by the structure of the respective glass network which shifts some of these bands to a higher wavelength, e.g., increasing the transmission at 450 and 550 nm. Exemplary alumina free, potassium silicate compositions described herein provide a glass network which was found to decrease the intensity of the absorption bands by changing the equilibrium state of the transition metal (e.g., Cr, Ni) to more be reduced, that is, by decreasing the absorption at lower wavelengths. For example, the Ni absorption in exemplary compositions described herein are better than sodium aluminosilicate compositions due to the use of $K_2O$ in the place of $Na_2O$. This is due in part to the larger bond length necessitated by $K_2O$ bonding shifting, e.g., Ni absorption away from 450 nm towards longer wavelengths. Such a shift dramatically increases an exemplary LGP 450 nm transmission and provides a competitive advantage for both color shift and possible use of blue LEDs in LGP assemblies.

The decrease in the absorption coefficients discovered in exemplary alumina free, potassium silicate compositions provides an additional advantage: the glass can have a higher concentration of tramp metals but still maintain the transmission and the color shift required by the industry. This directly results in an additional cost savings opportunity due to the utilization of lower purity raw materials equating to lower costs. It was also discovered that the exemplary alumina free, potassium silicate compositions described herein results in a reduction in manufacturing costs. For example, manufacturing cost was reduced by changing melting process parameters such as flow. Exemplary alumina free, potassium silicate compositions enable high flow in a fusion draw process which generally requires a viscosity curve that minimizes the difference between the melting viscosity (200P) and the draw viscosity (35 kP) to control the cooling rate of the glass melt, and in this situation provide a steeper viscosity curve resulting in a higher the flow rate. Exemplary viscosity curves of embodiments described herein also resulted in an improved melting furnace or tank lifetime due to lower wear of refractory (e.g., zirconia) materials.

In various embodiments, the glass composition of the glass sheet may comprise less than 50 ppm iron (Fe)

concentration. In some embodiments, there may be less than 25 ppm Fe, or in some embodiments the Fe concentration may be about 20 ppm or less. In additional embodiments, the glass sheet may be formed by a polished float glass, a fusion draw process, a slot draw process, a redraw process, or another suitable forming process.

According to one or more embodiments, the LGP can be made from a glass comprising colorless oxide components selected from the glass formers $SiO_2$, $Al_2O_3$, and/or $B_2O_3$. The exemplary glass may also include fluxes to obtain favorable melting and forming attributes. Such fluxes include alkali oxides ($Li_2O$, $Na_2O$, $K_2O$, $Rb_2O$ and $Cs_2O$) and alkaline earth oxides (MgO, CaO, SrO, ZnO and BaO). In one embodiment, the glass contains constituents in the range of between about 70 mol % to about 85 mol % $SiO_2$, between about 0 mol % to about 5 mol % $Al_2O_3$, between about 0 mol % to about 5 mol % $B_2O_3$, between about 0 mol % to about 10 mol % $Na_2O$, between about 0 mol % to about 12 mol % $K_2O$, between about 0 mol % to about 4 mol % ZnO, between about 3 mol % to about 12 mol % MgO, between about 0 mol % to about 5 mol % CaO, between about 0 mol % to about 3 mol % SrO, between about 0 mol % to about 3 mol % BaO, and between about 0.01 mol % to about 0.5 mol % $SnO_2$. Other glass compositions include a glass sheet having greater than about 80 mol % $SiO_2$, between about 0 mol % to about 0.5 mol % $Al_2O_3$, between about 0 mol % to about 0.5 mol % $B_2O_3$, between about 0 mol % to about 0.5 mol % $Na_2O$, between about 8 mol % to about 11 mol % $K_2O$, between about 0.01 mol % to about 4 mol % ZnO, between about 6 mol % to about 10 mol % MgO, between about 0 mol % to about 0.5 mol % CaO, between about 0 mol % to about 0.5 mol % SrO, between about 0 mol % to about 0.5 mol % BaO, and between about 0.01 mol % to about 0.11 mol % $SnO_2$. Further glass compositions include a glass sheet that is substantially free of $Al_2O_3$ and $B_2O_3$ and comprises greater than about 80 mol % $SiO_2$, between about 0 mol % to about 0.5 mol % $Na_2O$, between about 8 mol % to about 11 mol % $K_2O$, between about 0.01 mol % to about 4 mol % ZnO, between about 6 mol % to about 10 mol % MgO, and between about 0.01 mol % to about 0.11 mol % $SnO_2$. In some embodiments, the glass sheet is substantially free of $B_2O_3$, $Na_2O$, CaO, SrO, or BaO, and combinations thereof.

Additional glass compositions include a glass sheet that is an alumina free, potassium silicate composition comprising greater than about 80 mol % $SiO_2$, between about 8 mol % to about 11 mol % $K_2O$, between about 0.01 mol % to about 4 mol % ZnO, between about 6 mol % to about 10 mol % MgO, and between about 0.01 mol % to about 0.11 mol % $SnO_2$. In some embodiments, the glass sheet is substantially free of $B_2O_3$, $Na_2O$, CaO, SrO, or BaO, and combinations thereof. Further glass compositions include a glass sheet having between about 72.82 mol % to about 82.03 mol % $SiO_2$, between about 0 mol % to about 4.8 mol % $Al_2O_3$, between about 0 mol % to about 2.77 mol % $B_2O_3$, between about 0 mol % to about 9.28 mol % $Na_2O$, between about 0.58 mol % to about 10.58 mol % $K_2O$, between about 0 mol % to about 2.93 mol % ZnO, between about 3.1 mol % to about 10.58 mol % MgO, between about 0 mol % to about 4.82 mol % CaO, between about 0 mol % to about 1.59 mol % SrO, between about 0 mol % to about 3 mol % BaO, and between about 0.08 mol % to about 0.15 mol % $SnO_2$. In further embodiments, the glass sheet is substantially free of $Al_2O_3$, $B_2O_3$, $Na_2O$, CaO, SrO, or BaO, and combinations thereof.

Further glass compositions include a glass sheet substantially free of $Al_2O_3$ and $B_2O_3$ and comprises greater than about 80 mol % $SiO_2$, and wherein the glass has a color shift <0.005. In some embodiments, the glass sheet comprises between about 8 mol % to about 11 mol % $K_2O$, between about 0.01 mol % to about 4 mol % ZnO, between about 6 mol % to about 10 mol % MgO, and between about 0.01 mol % to about 0.11 mol % $SnO_2$. Additional glass compositions include a glass sheet that is substantially free of $Al_2O_3$, $B_2O_3$, $Na_2O$, CaO, SrO, and BaO, wherein the glass has a color shift <0.005. In some embodiments, the glass sheet comprises greater than about 80 mol % $SiO_2$. In some embodiments, the glass sheet comprises between about 8 mol % to about 11 mol % $K_2O$, between about 0.01 mol % to about 4 mol % ZnO, between about 6 mol % to about 10 mol % MgO, and between about 0.01 mol % to about 0.11 mol % $SnO_2$.

In some glass compositions described herein, $SiO_2$ can serve as the basic glass former. In certain embodiments, the concentration of $SiO_2$ can be greater than 60 mole percent to provide the glass with a density and chemical durability suitable for a display glasses or light guide plate glasses, and a liquidus temperature (liquidus viscosity), which allows the glass to be formed by a downdraw process (e.g., a fusion process). In terms of an upper limit, in general, the $SiO_2$ concentration can be less than or equal to about 80 mole percent to allow batch materials to be melted using conventional, high volume, melting techniques, e.g., Joule melting in a refractory melter. As the concentration of $SiO_2$ increases, the 200 poise temperature (melting temperature) generally rises. In various applications, the $SiO_2$ concentration is adjusted so that the glass composition has a melting temperature less than or equal to 1,750° C. In various embodiments, the mol % of $SiO_2$ may be in the range of about 70% to about 85%, or in the range of about 72.82% and 82.03%, or alternatively in the range of about 75% to about 85%, or in the range of about 80% to about 85%, and all subranges therebetween. In additional embodiments, the mol % of $SiO_2$ may be greater than about 80%, greater than about 81%, or greater than about 82%.

$Al_2O_3$ is another glass former used to make the glasses described herein. Higher mole percent $Al_2O_3$ can improve the glass's annealing point and modulus but can increase melting and batch costs. In various embodiments, the mol % of $Al_2O_3$ may be in the range of about 0% to about 5%, or alternatively in the range of about 0% to about 4.8%, or in the range of about 0% to about 4%, or in the range of about 0% to about 3%, and all subranges therebetween. In additional embodiments, the mol % of $Al_2O_3$ may be less than about 0.1%. In other embodiments, the glass is substantially free of $Al_2O_3$. For the avoidance of doubt, substantially free should be interpreted to mean that the glass does not have a constituent unless it was intentionally batched or added in the respective melting process and therefore its mol % is negligible or less than 0.01 mol %. With reference to these ranges of $Al_2O_3$, manufacturing costs for exemplary embodiments were significantly reduces as $Al_2O_3$ is an expensive raw material to purchase in pure form.

$B_2O_3$ is both a glass former and a flux that aids melting and lowers the melting temperature. It has an impact on both liquidus temperature and viscosity. Increasing $B_2O_3$ can be used to increase the liquidus viscosity of a glass. To achieve these effects, the glass compositions of one or more embodiments may have $B_2O_3$ concentrations that are equal to or greater than 0.1 mole percent; however, some compositions may have a negligible amount of $B_2O_3$. As discussed above with regard to $SiO_2$, glass durability is very important for display applications. Durability can be controlled somewhat by elevated concentrations of alkaline earth oxides, and significantly reduced by elevated $B_2O_3$ content. Annealing point decreases as $B_2O_3$ increases, so it may be helpful to keep $B_2O_3$ content low. Further, it was discovered that $B_2O_3$ shifts Fe redox to Fe' thereby impacting the blue transmission. Thus, a reduction in $B_2O_3$ was found to yield better optical properties in some embodiments. Thus, in various embodiments, the mol % of $B_2O_3$ may be in the range of about 0% to about 5%, or alternatively in the range of about 0% to about 4%, or in the range of about 0% to about 3%, in the range of about 0% to about 2.77%, and all subranges therebetween. In some embodiments, the glass may be substantially free of $B_2O_3$.

In addition to the glass formers ($SiO_2$, $Al_2O_3$, and $B_2O_3$), the glasses described herein also include alkaline earth oxides. In one embodiment, at least three alkaline earth oxides are part of the glass composition, e.g., MgO, CaO, BaO, and SrO. The alkaline earth oxides provide the glass with various properties important to melting, fining, forming, and ultimate use. Accordingly, to improve glass performance in these regards, in one embodiment, the (MgO+CaO+SrO+BaO)/$Al_2O_3$ ratio is between 0 and 2.0. As this ratio increases, viscosity tends to decrease more strongly than liquidus temperature, and thus it is increasingly difficult to obtain suitably high values for $T_{35k}-T_{liq}$. In embodiments that are substantially free of alumina, the ratio (MgO+CaO+SrO+BaO)/$Al_2O_3$ cannot be calculated (i.e., $Al_2O_3$ is zero or negligible).

For certain embodiments of this disclosure, the alkaline earth oxides may be treated as what is in effect a single compositional component. This is because their impact upon viscoelastic properties, liquidus temperatures and liquidus phase relationships are qualitatively more similar to one another than they are to the glass forming oxides $SiO_2$, $Al_2O_3$ and $B_2O_3$. However, the alkaline earth oxides CaO, SrO and BaO can form feldspar minerals, notably anorthite ($CaAl_2Si_2O_8$) and celsian ($BaAl_2Si_2O_8$) and strontium-bearing solid solutions of same, but MgO does not participate in these crystals to a significant degree. Therefore, when a feldspar crystal is already the liquidus phase, a superaddition of MgO may serves to stabilize the liquid relative to the crystal and thus lower the liquidus temperature. At the same time, the viscosity curve typically becomes steeper, reducing melting temperatures while having little or no impact on low-temperature viscosities.

The inventors have found that the addition of small amounts of MgO may benefit melting by reducing melting temperatures, forming by reducing liquidus temperatures and increasing liquidus viscosity, while preserving high annealing points. In various embodiments, the glass composition comprises MgO in an amount in the range of about 3 mol % to about 12 mol %, or in the range of about 6 mol % to about 10 mol %, or in the range of about 3.1 mol % to about 10.58 mol %, and all subranges therebetween.

Without being bound by any particular theory of operation, it is believed that calcium oxide present in the glass composition can produce low liquidus temperatures (high liquidus viscosities), high annealing points and moduli, and CTE's in the most desired ranges for display and light guide plate applications. It also contributes favorably to chemical durability, and compared to other alkaline earth oxides, it is relatively inexpensive as a batch material. However, at high concentrations, CaO increases the density and CTE. Furthermore, at sufficiently low $SiO_2$ concentrations, CaO may stabilize anorthite, thus decreasing liquidus viscosity. Accordingly, in one or more embodiment, the CaO concentration can be between 0 and 5 mol %. In various embodiments, the CaO concentration of the glass composition is in the range of about 0 mol % to about 4.82 mol %, or in the range of about 0 mol % to about 4 mol %, or in the range of about 0 mol % to about 3 mol %, or in the range of about 0 mol % to about 0.5 mol %, or in the range of about 0 mol % to about 0.1 mol %, and all subranges therebetween. In other embodiments, the glass is substantially free of CaO.

SrO and BaO can both contribute to low liquidus temperatures (high liquidus viscosities). The selection and concentration of these oxides can be selected to avoid an increase in CTE and density and a decrease in modulus and annealing point. The relative proportions of SrO and BaO can be balanced so as to obtain a suitable combination of physical properties and liquidus viscosity such that the glass can be formed by a downdraw process. In various embodiments, the glass comprises SrO in the range of about 0 to about 2.0 mol %, or between about 0 mol % to about 1.59 mol %, or about 0 to about 1 mol %, and all subranges therebetween. In other embodiments, the glass is substantially free of SrO. In one or more embodiments, the glass comprises BaO in the range of about 0 to about 2 mol %, or between 0 to about 1.5 mol %, or between 0 to about 1.0 mol %, and all subranges therebetween. In other embodiments, the glass is substantially free of BaO.

In addition to the above components, the glass compositions described herein can include various other oxides to adjust various physical, melting, fining, and forming attributes of the glasses. Examples of such other oxides include, but are not limited to, $TiO_2$, MnO, $V_2O_5$, $Fe_2O_3$, $ZrO_2$, ZnO, $Nb_2O_5$, $MoO_3$, $Ta_2O_5$, $WO_3$, $Y_2O_3$, $La_2O_3$ and $CeO_2$ as well as other rare earth oxides and phosphates. In one embodiment, the amount of each of these oxides can be less than or equal to 2.0 mole percent, and their total combined concentration can be less than or equal to 5.0 mole percent. In some embodiments, the glass composition comprises ZnO in an amount in the range of about 0 to about 4.0 mol %, or about 0 to about 3.5 mol %, or about 0 to about 3.01 mol %, or about 0 to about 2.0 mol %, and all subranges therebetween. In other embodiments, the glass composition comprises from about 0.1 mol % to about 1.0 mol % titanium oxide; from about 0.1 mol % to about 1.0 mol % vanadium oxide; from about 0.1 mol % to about 1.0 mol % niobium oxide; from about 0.1 mol % to about 1.0 mol % manganese oxide; from about 0.1 mol % to about 1.0 mol % zirconium oxide; from about 0.1 mol % to about 1.0 mol % tin oxide; from about 0.1 mol % to about 1.0 mol % molybdenum oxide; from about 0.1 mol % to about 1.0 mol % cerium oxide; and all subranges therebetween of any of the above listed transition metal oxides. The glass compositions described herein can also include various contaminants associated with batch materials and/or introduced into the glass by the melting, fining, and/or forming equipment used to produce the glass. The glasses can also contain $SnO_2$ either as a result of Joule melting using tin-oxide electrodes and/or through the batching of tin containing materials, e.g., $SnO_2$, SnO, $SnCO_3$, $SnC_2O_2$, etc.

It was also discovered that increasing silica content and/or adding ZnO to some embodiments improved the surface durability of the glass. Thus, in some embodiments the glass composition comprises ZnO in an amount in the range of about 0 to about 4 mol %, or about 0.01 to about 4 mol %, or about 0 to about 2.93 mol %, and all subranges therebetween The glass compositions described herein can contain some alkali constituents, e.g., these glasses are not alkali-free glasses. As used herein, an "alkali-free glass" is a glass having a total alkali concentration which is less than or equal to 0.1 mole percent, where the total alkali concentration is the sum of the $Na_2O$, $K_2O$, and $Li_2O$ concentrations. In some embodiments, the glass comprises $Li_2O$ in the range of about 0 to about 3.0 mol %, in the range of about 0 to about 2.0 mol %, or in the range of about 0 to about 1.0 mol %, and all subranges therebetween. In other embodiments, the glass is substantially free of $Li_2O$. In other embodiments, the glass comprises $Na_2O$ in the range of about 0 mol % to about 10 mol %, in the range of about 0 mol % to about 9.28 mol %, in the range of about 0 to about 5 mol %, in the range of about 0 to about 3 mol %, or in the range of about 0 to about 0.5 mol %, and all subranges therebetween. In other embodiments, the glass is substantially free of $Na_2O$. In some embodiments, the glass comprises $K_2O$ in the range of about 0 to about 12.0 mol %, in the range of about 8 to about 11 mol %, in the range of about 0.58 to about 10.58 mol %, and all subranges therebetween. With reference to these ranges of $K_2O$, $Na_2O$, and other alkali materials, it was discovered that contaminant constituent (e.g., Ni, Fe, Cr) absorbance was better due to the larger bond length necessitated by $K_2O$ bonding which shifts the constituent (Ni, Fe, Cr) absorption away from 450 nm towards longer wavelengths. This shift dramatically increases the 450 nm transmission of exemplary embodiments thereby providing a competitive advantage for both color shift and use of blue LEDs in LGPs. Further, it was also unexpectedly discovered that the lower absorpotion bands of Ni, Fe, and/or Cr allow for the utilization of less pure raw materials while maintaining properties of the current glass which decreases overall cost.

In some embodiments, the glass compositions described herein can have one or more or all of the following compositional characteristics: (i) an $As_2O_3$ concentration of at most 0.05 to 1.0 mol %; (ii) an $Sb_2O_3$ concentration of at most 0.05 to 1.0 mol %; (iii) a $SnO_2$ concentration of at most 0.25 to 3.0 mol %.

$As_2O_3$ is an effective high temperature fining agent for display glasses, and in some embodiments described herein, $As_2O_3$ is used for fining because of its superior fining properties. However, $As_2O_3$ is poisonous and requires special handling during the glass manufacturing process. Accordingly, in certain embodiments, fining is performed without the use of substantial amounts of $As_2O_3$, i.e., the finished glass has at most 0.05 mole percent $As_2O_3$. In one embodiment, no $As_2O_3$ is purposely used in the fining of the glass. In such cases, the finished glass will typically have at most 0.005 mole percent $As_2O_3$ as a result of contaminants present in the batch materials and/or the equipment used to melt the batch materials.

Although not as toxic as $As_2O_3$, $Sb_2O_3$ is also poisonous and requires special handling. In addition, $Sb_2O_3$ raises the density, raises the CTE, and lowers the annealing point in comparison to glasses that use $As_2O_3$ or $SnO_2$ as a fining agent. Accordingly, in certain embodiments, fining is performed without the use of substantial amounts of $Sb_2O_3$, i.e., the finished glass has at most 0.05 mole percent $Sb_2O_3$. In another embodiment, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

Compared to $As_2O_3$ and $Sb_2O_3$ fining, tin fining (i.e., $SnO_2$ fining) is less effective, but $SnO_2$ is a ubiquitous material that has no known hazardous properties. Also, for many years, $SnO_2$ has been a component of display glasses through the use of tin oxide electrodes in the Joule melting of the batch materials for such glasses. The presence of $SnO_2$ in display glasses has not resulted in any known adverse effects in the use of these glasses in the manufacture of liquid crystal displays. However, high concentrations of $SnO_2$ are not preferred as this can result in the formation of crystalline defects in display glasses. In one embodiment, the concentration of $SnO_2$ in the finished glass is less than or equal to 0.5 mole percent, in the range of about 0.01 to about 0.5 mol %, in the range of about 0.01 to about 0.11 mol %, from about 0.08 to about 0.15 mol %, and all subranges therebetween.

Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. In certain embodiments, maintaining the $(MgO+CaO+SrO+BaO)/Al_2O_3$ ratio and individual alkaline earth concentrations within the ranges discussed above makes the fining process easier to perform and more effective.

In one or more embodiments and as noted above, exemplary glasses can have low concentrations of elements that produce visible absorption when in a glass matrix. Such absorbers include transition elements such as Ti, V, Cr, Mn, Fe, Co, Ni and Cu, and rare earth elements with partially-filled f-orbitals, including Ce, Pr, Nd, Sm, Eu, Tb, Dy, Ho, Er and Tm. Of these, the most abundant in conventional raw materials used for glass melting are Fe, Cr and Ni. Iron is a common contaminant in sand, the source of $SiO_2$, and is a typical contaminant as well in raw material sources for aluminum, magnesium and calcium. Chromium and nickel are typically present at low concentration in normal glass raw materials, but can be present in various ores of sand and must be controlled at a low concentration. Additionally, chromium and nickel can be introduced via contact with stainless steel, e.g., when raw material or cullet is jaw-crushed, through erosion of steel-lined mixers or screw feeders, or unintended contact with structural steel in the melting unit itself. The concentration of iron in some embodiments can be specifically less than 50 ppm, more specifically less than 40 ppm, or less than 25 ppm, and the concentration of Ni and Cr can be specifically less than 5 ppm, and more specifically less than 2 ppm. In further embodiments, the concentration of all other absorbers listed above may be less than 1 ppm for each. In various embodiments the glass comprises 1 ppm or less of Co, Ni, and Cr, or alternatively less than 1 ppm of Co, Ni, and Cr. In various embodiments, the transition elements (V, Cr, Mn, Fe, Co, Ni and Cu) may be present in the glass at 0.1 wt % or less. In some embodiments, the concentration of Fe can be <about 50 ppm, <about 40 ppm, <about 30 ppm, <about 20 ppm, or <about 10 ppm.

In other embodiments, it has been discovered that the addition of certain transition metal oxides that do not cause absorption from 300 nm to 650 nm and that have absorption bands <about 300 nm will prevent network defects from forming processes and will prevent color centers (e.g., absorption of light from 300 nm to 650 nm) post UV exposure when curing ink since the bond by the transition metal oxide in the glass network will absorb the light instead of allowing the light to break up the fundamental bonds of the glass network. Thus, exemplary embodiments can include any one or combination of the following transition metal oxides to minimize UV color center formation: from about 0.1 mol % to about 3.0 mol % zinc oxide; from about 0.1 mol % to about 1.0 mol % titanium oxide; from about 0.1 mol % to about 1.0 mol % vanadium oxide; from about 0.1 mol % to about 1.0 mol % niobium oxide; from about 0.1 mol % to about 1.0 mol % manganese oxide; from about 0.1 mol % to about 1.0 mol % zirconium oxide; from about 0.1 mol % to about 1.0 mol % arsenic oxide; from about 0.1 mol % to about 1.0 mol % tin oxide; from about 0.1 mol % to about 1.0 mol % molybdenum oxide; from about 0.1 mol % to about 1.0 mol % antimony oxide; from about 0.1 mol % to about 1.0 mol % cerium oxide; and all subranges therebetween of any of the above listed transition metal oxides. In some embodiments, an exemplary glass can contain from 0.1 mol % to less than or no more than about 3.0 mol % of any combination of zinc oxide, titanium oxide, vanadium oxide, niobium oxide, manganese oxide, zirconium oxide, arsenic oxide, tin oxide, molybdenum oxide, antimony oxide, and cerium oxide.

Even in the case that the concentrations of transition metals are within the above described ranges, there can be matrix and redox effects that result in undesired absorption. As an example, it is well-known to those skilled in the art that iron occurs in two valences in glass, the +3 or ferric state, and the +2 or ferrous state. In glass, $Fe^{3+}$ produces absorptions at approximately 380, 420 and 435 nm, whereas $Fe^{2+}$ absorbs mostly at IR wavelengths. Therefore, according to one or more embodiments, it may be desirable to force as much iron as possible into the ferrous state to achieve high transmission at visible wavelengths. One non-limiting method to accomplish this is to add components to the glass batch that are reducing in nature. Such components could include carbon, hydrocarbons, or reduced forms of certain metalloids, e.g., silicon, boron or aluminum. However it is achieved, if iron levels were within the described range, according to one or more embodiments, at least 10% of the iron in the ferrous state and more specifically greater than 20% of the iron in the ferrous state, improved transmissions can be produced at short wavelengths. Thus, in various embodiments, the concentration of iron in the glass produces less than 1.1 dB/500 mm of attenuation in the glass sheet.

LCD Panel Rigidity

One attribute of LCD panels is the overall thickness. In conventional attempts to make thinner structures, lack of sufficient stiffness has become a serious problem. Stiffness, however, can be increased with an exemplary glass LGP since the elastic modulus of glass is considerably larger than that of PMMA. In some embodiments, to obtain a maximum benefit from a stiffness point of view, all elements of the panel can be bonded together at the edge.

Figure 3:
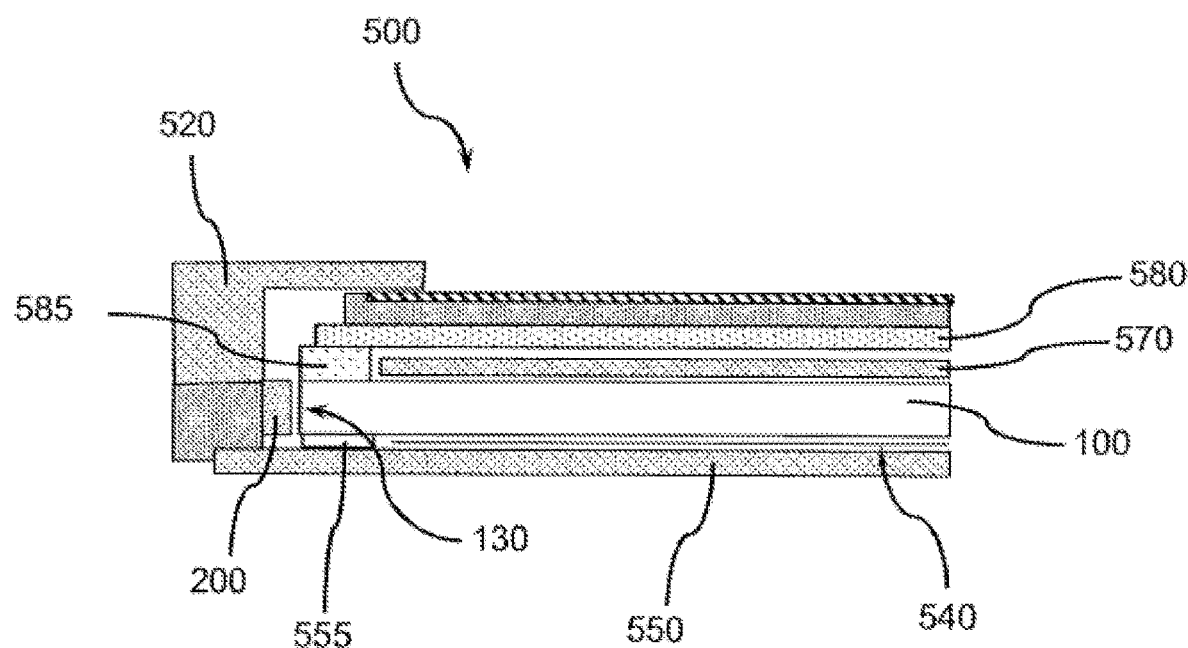
FIG. 3 is a cross sectional illustration of an exemplary LCD panel with a LGP in accordance with one or more embodiments.

FIG. 3 is a cross sectional illustration of an exemplary LCD panel with a LGP in accordance with one or more embodiments. With reference to FIG. 3, an exemplary embodiment of a panel structure 500 is provided. The structure comprises an LGP 100 mounted on a back plate 550 through which light can travel and be redirected toward the LCD or an observer. A structural element 555 may affix the LGP 100 to the back plate 550, and create a gap between the back face of the LGP and a face of the back plate. A reflective and/or diffusing film 540 may be positioned between the back face of the LGP 100 and the back plate 550 to send recycled light back through the LGP 100. A plurality of LEDs, organic light emitting diodes (OLEDs), or cold cathode fluorescent lamps (CCFLs) may be positioned adjacent to the light injection edge 130 of the LGP, where the LEDs have the same width as the thickness of the LGP 100, and are at the same height as the LGP 100. In other embodiments, the LEDs have a greater width and/or height as the thickness of the LGP 100. Conventional LCDs may employ LEDs or CCFLs packaged with color converting phosphors to produce white light. One or more backlight film(s) 570 may be positioned adjacent the front face of the LGP 100. An LCD panel 580 may also be positioned above the front face of the LGP 100 with a structural element 585, and the backlight film(s) 570 may be located in the gap between the LGP 100 and LCD panel 580. Light from the LGP 100 can then pass through the film 570, which can backscatter high angle light and reflect low angle light back toward the reflector film 540 for recycling and may serve to concentrate light in the forward direction (e.g., toward the user). A bezel 520 or other structural member may hold the layers of the assembly in place. A liquid crystal layer (not shown) may be used and may comprise an electro-optic material, the structure of which rotates upon application of an electric field, causing a polarization rotation of any light passing through it. Other optical components can include, e.g., prism films, polarizers, or TFT arrays, to name a few. According to various embodiments, the angular light filters disclosed herein can be paired with a transparent light guide plate in a transparent display device. In some embodiments, the LGP can be bonded to the structure (using optically clear adhesive OCA or pressure sensitive adhesive PSA) where the LGP is placed in optical contact with some of the structural elements of the panel. In other words, some of the light may leak out of the light guide through the adhesive. This leaked light can become scattered or absorbed by those structural elements. As explained above, the first edge where the LEDs are coupled into the LGP and the two adjacent edges where the light needs to be reflected in TIR can avoid this problem if properly prepared.

Exemplary widths and heights of the LGP generally depend upon the size of the respective LCD panel. It should be noted that embodiments of the present subject matter are applicable to any size LCD panel whether small (<40" diagonal) or large (>40" diagonal) displays. Exemplary dimensions for LGPs include, but are not limited to, 20", 30", 40", 50", 60" diagonal or more.

Figure 4:
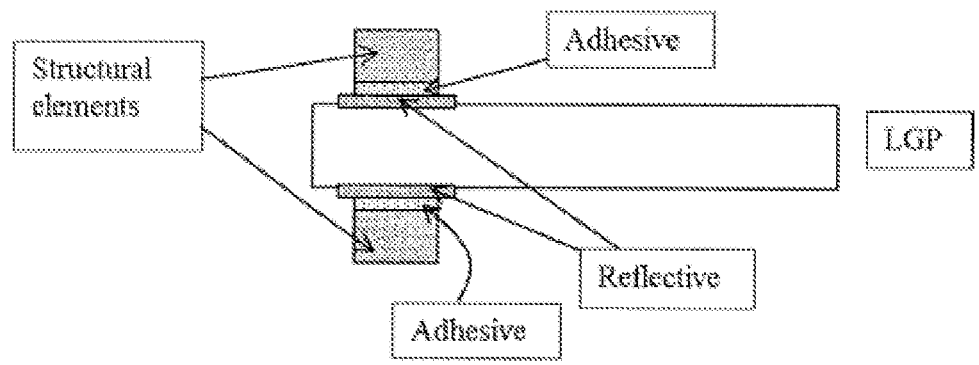
FIG. 4 is a cross sectional illustration of an exemplary LCD panel with a LGP according to another embodiment.

FIG. 4 is a cross sectional illustration of an exemplary LCD panel with a LGP according to another embodiment. With reference to FIG. 4, additional embodiments can utilize a reflective layer. Losses in some embodiments can be minimized by inserting a reflective surface between the LGP and the epoxy by either metalizing the glass with, for instance, silver or inkjet print with reflective ink. In other embodiments, highly reflective films (such as Enhanced Specular Reflector films (made by 3M)) may be laminated with the LGP.

Figure 5:
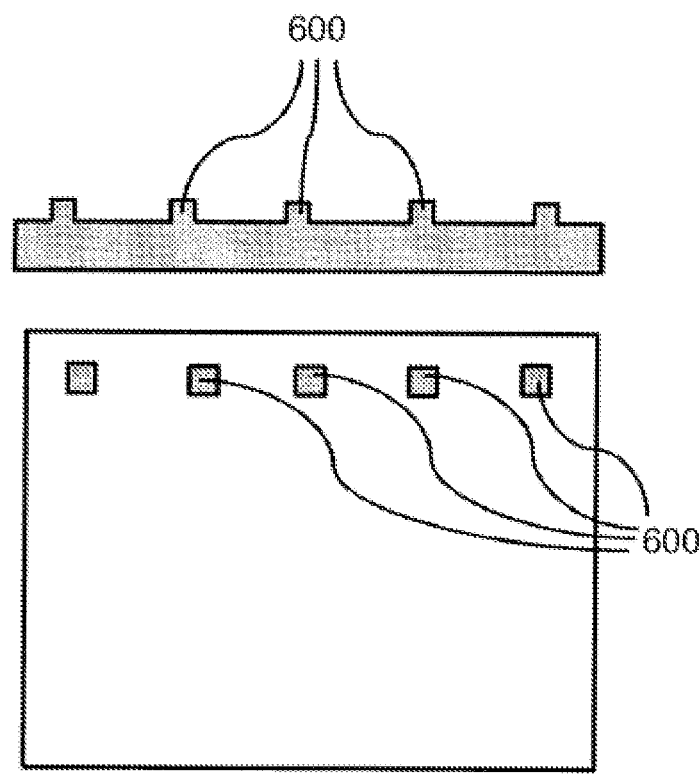
FIG. 5 is a pictorial illustration showing an LGP with adhesion pads according to additional embodiments.

FIG. 5 is a pictorial illustration showing an LGP with adhesion pads according to additional embodiments. With reference to FIG. 5, adhesion pads instead of a continuous adhesive can be used in which the pads 600 are shown as a series of dark squares. Thus, to limit the surface of LGP that is optically connected to the structural elements, the illustrated embodiment can employ 5×5 mm square pads every 50 mm to provide sufficient adhesion where extracted light is less than 4%. Of course, the pads 600 may be circular or another polygon in form and may be provided in any array or spacing and such a description should not limit the scope of the claims appended herewith.

Color Shift Compensation

In prior glasses although decreasing iron concentration minimized absorption and yellow shift, it was difficult to eliminate it completely. The $\Delta x$, $\Delta y$ in the measured for PMMA for a propagation distance of about 700 mm was 0.0021 and 0.0063. In exemplary glasses having the compositional ranges described herein, the color shift $\Delta y$ was <0.015 and in exemplary embodiments was less than 0.0021, and less than 0.0063. For example, in some embodiments, the color shift was measured as 0.007842 and in other embodiments was measured as 0.005827. In other embodiments, an exemplary glass sheet can comprise a color shift Δy less than 0.015, such as ranging from about 0.001 to about 0.015 (e.g., about 0.001, 0.002, 0.003, 0.004, 0.005, 0.006, 0.007, 0.008, 0.009, 0.010, 0.011, 0.012, 0.013, 0.014, or 0.015). In other embodiments, the transparent substrate can comprise a color shift less than 0.008, less than about 0.005, or less than about 0.003. Color shift may be characterized by measuring variation in the x and/or y chromaticity coordinates along a length L using the CIE 1931 standard for color measurements for a given source illumination. For exemplary glass light-guide plates the color shift Δy can be reported as $\Delta y = y(L_2) - y(L_1)$ where $L_2$ and $L_1$ are Z positions along the panel or substrate direction away from the source launch (e.g., LED or otherwise) and where $L_2 - L_1 = 0.5$ meters. Exemplary light-guide plates described herein have Δy<0.015, Δy<0.005, Δy<0.003, or Δy<0.001. The color shift of a light guide plate can be estimated by measuring the optical absorption of the light guide plate, using the optical absorption to calculate the internal transmission of the LGP over 0.5 m, and then multiplying the resulting transmission curve by a typical LED source used in LCD backlights such as the Nichia NFSW157D-E. One can then use the CIE color matching functions to compute the (X,Y,Z) tristimulus values of this spectrum. These values are then normalized by their sum to provide the (x,y) chromaticity coordinates. The difference between the (x,y) values of the LED spectrum multiplied by the 0.5 m LGP transmission and the (x,y) values of the original LED spectrum is the estimate of the color shift contribution of the light guide material. To address residual color shift, several exemplary solutions may be implemented. In one embodiment, light guide blue painting can be employed. By blue painting the light guide, one can artificially increase absorption in red and green and increase light extraction in blue. Accordingly, knowing how much differential color absorption exists, a blue paint pattern can be back calculated and applied that can compensate for color shift. In one or more embodiments, shallow surface scattering features can be employed to extract light with an efficiency that depends on the wavelength. As an example, a square grating has a maximum of efficiency when the optical path difference equals half of the wavelength. Accordingly, exemplary textures can be used to preferentially extract blue and can be added to the main light extraction texture. In additional embodiments, image processing can also be utilized. For example, an image filter can be applied that will attenuate blue close to the edge where light gets injected. This may require shifting the color of the LEDs themselves to keep the right white color. In further embodiments, pixel geometry can be used to address color shift by adjusting the surface ratio of the RGB pixels in the panel and increasing the surface of the blue pixels far away from the edge where the light gets injected.

Exemplary compositions as heretofore described can thus be used to achieve a strain point ranging from about 512° C. to about 653° C., from about 540° C. to about 640° C., or from about 570° C. to about 610° C. and all subranges therebetween. An exemplary annealing point can range from about 564° C. to about 721° C., from about 580° C. to about 700° C., and all subranges therebetween. An exemplary softening point of a glass ranges from about 795° C. to about 1013° C., from about 820° C. to about 990° C., or from about 850° C. to about 950° C. and all subranges therebetween. The density of exemplary glass compositions can range from about 2.34 gm/cc @ 20 C to about 2.56 gm/cc @ 20 C, from about 2.35 gm/cc @ 20 C to about 2.55 gm/cc @ 20 C, or from about 2.4 gm/cc @ 20 C to about 2.5 gm/cc @ 20 C and all subranges therebetween. CTEs (0-300° C.) for exemplary embodiments can range from about 64×10−7/° C. to about 77×10−7/° C., from about 66×10−7/° C. to about 75×10−7/° C., or from about 68×10−7/° C. to about 73×10−7/° C. and all subranges therebetween.

Certain embodiments and compositions described herein have provided an internal transmission from 400-700 nm greater than 90%, greater than 91%, greater than 92%, greater than 93%, greater than 94%, and even greater than 95%. Internal transmittance can be measured by comparing the light transmitted through a sample to the light emitted from a source. Broadband, incoherent light may be cylindrically focused on the end of the material to be tested. The light emitted from the far side may be collected by an integrating sphere fiber coupled to a spectrometer and forms the sample data. Reference data is obtained by removing the material under test from the system, translating the integrating sphere directly in front of the focusing optic, and collecting the light through the same apparatus as the reference data. The absorption at a given wavelength is then given by:

$$\text{absorption(dB/m)} = \frac{-10\log\frac{T_{sample\ data}}{T_{reference\ data}}}{(Pathlength_{sample\ data} - Pathlength_{reference\ data})}$$

The internal transmittance over 0.5 m is given by:

$$\text{Transmittance (\%)} = 100 \times 10^{-absorption \times 0.5/10}$$

Thus, exemplary embodiments described herein can have an internal transmittance at 450 nm with 500 mm in length of greater than 85%, greater than 90%, greater than 91%, greater than 92%, greater than 93%, greater than 94%, and even greater than 95%. Exemplary embodiments described herein can also have an internal transmittance at 550 nm with 500 mm in length of greater than 90%, greater than 91%, greater than 92%, greater than 93%, greater than 94%, and even greater than 96%. Further embodiments described herein can have a transmittance at 630 nm with 500 mm in length of greater than 85%, greater than 90%, greater than 91%, greater than 92%, greater than 93%, greater than 94%, and even greater than 95%.

In one or more embodiments, the LGP has a width of at least about 1270 mm and a thickness of between about 0.5 mm and about 3.0 mm, wherein the transmittance of the LGP is at least 80% per 500 mm. In various embodiments, the thickness of the LGP is between about 1 mm and about 8 mm, and the width of the plate is between about 1100 mm and about 1300 mm.

In one or more embodiments, the LGP can be strengthened. For example, certain characteristics, such as a moderate compressive stress (CS), high depth of compressive layer (DOL), and/or moderate central tension (CT) can be provided in an exemplary glass sheet used for a LGP. One exemplary process includes chemically strengthening the glass by preparing a glass sheet capable of ion exchange. The glass sheet can then be subjected to an ion exchange process, and thereafter the glass sheet can be subjected to an anneal process if necessary. Of course, if the CS and DOL of the glass sheet are desired at the levels resulting from the ion exchange step, then no annealing step is required. In other embodiments, an acid etching process can be used to increase the CS on appropriate glass surfaces. The ion exchange process can involve subjecting the glass sheet to a molten salt bath including KNO$_3$, preferably relatively pure KNO$_3$ for one or more first temperatures within the range of about 400-500° C. and/or for a first time period within the range of about 1-24 hours, such as, but not limited to, about 8 hours. It is noted that other salt bath compositions are possible and would be within the skill level of an artisan to consider such alternatives. Thus, the disclosure of KNO$_3$ should not limit the scope of the claims appended herewith. Such an exemplary ion exchange process can produce an initial CS at the surface of the glass sheet, an initial DOL into the glass sheet, and an initial CT within the glass sheet. Annealing can then produce a final CS, final DOL and final CT as desired.

Examples

The following examples are set forth below to illustrate the methods and results according to the disclosed subject matter. These examples are not intended to be inclusive of all embodiments of the subject matter disclosed herein, but rather to illustrate representative methods and results. These examples are not intended to exclude equivalents and variations of the present disclosure which are apparent to one skilled in the art.

Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. The compositions themselves are given in mole percent on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

The glass properties set forth herein and in Table 1 below were determined in accordance with techniques conventional in the glass art. Thus, the linear coefficient of thermal expansion (CTE) over the temperature range 25-300° C. is expressed in terms of $\times 10-7$/° C. and the annealing point is expressed in terms of ° C. These were determined from fiber elongation techniques (ASTM references E228-85 and C336, respectively). The density in terms of grams/cm3 was measured via the Archimedes method (ASTM C693). The melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81).

The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours), to observe slower growing phases. The liquidus viscosity in poises was determined from the liquidus temperature and the coefficients of the Fulcher equation. If included, Young's modulus values in terms of GPa were determined using a resonant ultrasonic spectroscopy technique of the general type set forth in ASTM E1875-00e1.

The exemplary glasses of the tables herein were prepared using a commercial sand as a silica source, milled such that 90% by weight passed through a standard U.S. 100 mesh sieve. Alumina was the alumina source, periclase was the source for MgO; limestone the source for CaO, strontium carbonate, strontium nitrate or a mix thereof was the source for SFO, barium carbonate was the source for BaO, and tin (IV) oxide was the source for SnO$_2$. The raw materials were thoroughly mixed, loaded into a platinum vessel suspended in a furnace heated by silicon carbide glowbars, melted and stirred for several hours at temperatures between 1600 and 1650° C. to ensure homogeneity, and delivered through an orifice at the base of the platinum vessel. The resulting patties of glass were annealed at or near the annealing point, and then subjected to various experimental methods to determine physical, viscous and liquidus attributes.

These methods are not unique, and the glasses of the tables herein can be prepared using standard methods well-known to those skilled in the art. Such methods include a continuous melting process, such as would be performed in a continuous melting process, wherein the melter used in the continuous melting process is heated by gas, by electric power, or combinations thereof.

Raw materials appropriate for producing exemplary glasses include commercially available sands as sources for SiO2; alumina, aluminum hydroxide, hydrated forms of alumina, and various aluminosilicates; nitrates and halides as sources for Al2O3; boric acid, anhydrous boric acid and boric oxide as sources for B2O3; periclase, dolomite (also a source of CaO), magnesia, magnesium carbonate; magnesium hydroxide, and various for ins of magnesium silicates, aluminosilicates, nitrates and halides as sources for MgO; limestone, aragonite, dolomite (also a source of MgO), wolastonite, and various forms of calcium silicates, aluminosilicates, nitrates and halides as sources for CaO; and oxides, carbonates, nitrates and halides of strontium and barium. If a chemical fining agent is desired, tin can be added as SnO2, as a mixed oxide with another major glass component (e.g., CaSnO3), or in oxidizing conditions as SnO, tin oxalate, tin halide, or other compounds of tin known to those skilled in the art.

The glasses in the tables herein can contain SnO2 as a fining agent, but other chemical fining agents could also be employed to obtain glass of sufficient quality for display applications. For example, exemplary glasses could employ any one or combinations of As2O3, Sb2O3, CeO2, Fe2O3, and halides as deliberate additions to facilitate fining; and any of these could be used in conjunction with the SnO2 chemical fining agent shown in the examples. Of these, As2O3 and Sb2O3 are generally recognized as hazardous materials, subject to control in waste streams such as might be generated in the course of glass manufacture or in the processing of TFT panels. It is therefore desirable to limit the concentration of As2O3 and Sb2O3 individually or in combination to no more than 0.005 mol %.

In addition to the elements deliberately incorporated into exemplary glasses, nearly all stable elements in the periodic table are present in glasses at some level, either through low levels of contamination in the raw materials, through high-temperature erosion of refractories and precious metals in the manufacturing process, or through deliberate introduction at low levels to fine tune the attributes of the final glass. For example, zirconium may be introduced as a contaminant via interaction with zirconium-rich refractories. As a further example, platinum and rhodium may be introduced via interactions with precious metals. As a further example, iron may be introduced as a tramp in raw materials, or deliberately added to enhance control of gaseous inclusions. As a further example, manganese may be introduced to control color or to enhance control of gaseous inclusions.

Hydrogen is inevitably present in the form of the hydroxyl anion, OH—, and its presence can be ascertained via standard infrared spectroscopy techniques. Dissolved hydroxyl ions significantly and nonlinearly impact the annealing point of exemplary glasses, and thus to obtain the desired annealing point it may be necessary to adjust the concentrations of major oxide components so as to compensate. Hydroxyl ion concentration can be controlled to some extent through choice of raw materials or choice of melting system. For example, boric acid is a major source of hydroxyls, and replacing boric acid with boric oxide can be a useful means to control hydroxyl concentration in the final glass. The same reasoning applies to other potential raw materials comprising hydroxyl ions, hydrates, or compounds comprising physisorbed or chemisorbed water molecules. If burners are used in the melting process, then hydroxyl ions can also be introduced through the combustion products from combustion of natural gas and related hydrocarbons, and thus it may be desirable to shift the energy used in melting from burners to electrodes to compensate. Alternatively, one might instead employ an iterative process of adjusting major oxide components so as to compensate for the deleterious impact of dissolved hydroxyl ions.

Sulfur is often present in natural gas, and likewise is a tramp component in many carbonate, nitrate, halide, and oxide raw materials. In the form of $SO_2$, sulfur can be a troublesome source of gaseous inclusions. The tendency to form $SO_2$-rich defects can be managed to a significant degree by controlling sulfur levels in the raw materials, and by incorporating low levels of comparatively reduced multivalent cations into the glass matrix. While not wishing to be bound by theory, it appears that $SO_2$-rich gaseous inclusions arise primarily through reduction of sulfate ($SO4=$) dissolved in the glass. The elevated barium concentrations of exemplary glasses appear to increase sulfur retention in the glass in early stages of melting, but as noted above, barium is required to obtain low liquidus temperature, and hence high T35k-Tliq and high liquidus viscosity. Deliberately controlling sulfur levels in raw materials to a low level is a useful means of reducing dissolved sulfur (presumably as sulfate) in the glass. In particular, sulfur is preferably less than 200 ppm by weight in the batch materials, and more preferably less than 100 ppm by weight in the batch materials.

Reduced multivalents can also be used to control the tendency of exemplary glasses to form $SO_2$ blisters. While not wishing to be bound to theory, these elements behave as potential electron donors that suppress the electromotive force for sulfate reduction. Sulfate reduction can be written in terms of a half reaction such as $SO4= \rightarrow SO2+O2+2e-$ where e– denotes an electron. The "equilibrium constant" for the half reaction is $Keq=[SO2][O2][e-]2/[SO4=]$ where the brackets denote chemical activities. Ideally one would like to force the reaction so as to create sulfate from $SO_2$, $O_2$ and 2e–. Adding nitrates, peroxides, or other oxygen-rich raw materials may help, but also may work against sulfate reduction in the early stages of melting, which may counteract the benefits of adding them in the first place. $SO_2$ has very low solubility in most glasses, and so is impractical to add to the glass melting process. Electrons may be "added" through reduced multivalents. For example, an appropriate electron-donating half reaction for ferrous iron ($Fe2+$) is expressed as $2Fe2+ \rightarrow 2Fe3++2e-$ This "activity" of electrons can force the sulfate reduction reaction to the left, stabilizing $SO4=$ in the glass. Suitable reduced multivalents include, but are not limited to, $Fe2+$, $Sn2+$, $Sb3+$, $As3+$, $V3+$, $Ti3+$, and others familiar to those skilled in the art. In each case, it may be important to minimize the concentrations of such components so as to avoid deleterious impact on color of the glass, or in the case of As and Sb, to avoid adding such components at a high enough level so as to complication of waste management in an end-user's process.

In addition to the major oxides components of exemplary glasses, and the minor or tramp constituents noted above, halides may be present at various levels, either as contaminants introduced through the choice of raw materials, or as deliberate components used to eliminate gaseous inclusions in the glass. As a fining agent, halides may be incorporated at a level of about 0.4 mol % or less, though it is generally desirable to use lower amounts if possible to avoid corrosion of off-gas handling equipment. In some embodiments, the concentrations of individual halide elements are below about 200 ppm by weight for each individual halide, or below about 800 ppm by weight for the sum of all halide elements.

In addition to these major oxide components, minor and tramp components, multivalents and halide fining agents, it may be useful to incorporate low concentrations of other colorless oxide components to achieve desired physical, solarization, optical or viscoelastic properties. Such oxides include, but are not limited to, $TiO2$, $ZrO2$, $HfO2$, $Nb2O5$, $Ta2O5$, $MoO3$, $WO3$, $ZnO$, $In2O3$, $Ga2O3$, $Bi2O3$, $GeO2$, $PbO$, $SeO3$, $TeO2$, $Y_2O_3$, $La_2O_3$, $Gd2O3$, and others known to those skilled in the art. By adjusting the relative proportions of the major oxide components of exemplary glasses, such colorless oxides can be added to a level of up to about 2 mol % to 3 mol % without unacceptable impact to annealing point, T35k-Tliq or liquidus viscosity. For example, some embodiments can include any one or combination of the following transition metal oxides to minimize UV color center formation: from about 0.1 mol % to about 3.0 mol % zinc oxide; from about 0.1 mol % to about 1.0 mol % titanium oxide; from about 0.1 mol % to about 1.0 mol % vanadium oxide; from about 0.1 mol % to about 1.0 mol % niobium oxide; from about 0.1 mol % to about 1.0 mol % manganese oxide; from about 0.1 mol % to about 1.0 mol % zirconium oxide; from about 0.1 mol % to about 1.0 mol % arsenic oxide; from about 0.1 mol % to about 1.0 mol % tin oxide; from about 0.1 mol % to about 1.0 mol % molybdenum oxide; from about 0.1 mol % to about 1.0 mol % antimony oxide; from about 0.1 mol % to about 1.0 mol % cerium oxide; and all subranges therebetween of any of the above listed transition metal oxides. In some embodiments, an exemplary glass can contain from 0.1 mol % to less than or no more than about 3.0 mol % of any combination of zinc oxide, titanium oxide, vanadium oxide, niobium oxide, manganese oxide, zirconium oxide, arsenic oxide, tin oxide, molybdenum oxide, antimony oxide, and cerium oxide.

Table 1 shows examples of glasses (samples 1-106) with high ransmissibility as described herein.

TABLE 1

|  | 1 | 2 | 3 | 4 | 5 | 6 | 7 |
|---|---|---|---|---|---|---|---|
| SiO2 | 80.53 | 80.59 | 80.24 | 76.24 | 79.6 | 79.13 | 82.03 |
| Al2O3 | 0 | 0 | 0 | 4.8 | 0.6 | 1.71 | 0 |
| B2O3 | 1.7 | 0 | 0 | 0 | 0 | 1.63 | 2.52 |
| Li2O | 0 | 0 | 0 | 0 | 0 | 0 | 0 |
| Na2O | 1.4 | 0 | 0.96 | 11.36 | 1.59 | 3.14 | 1.88 |
| K2O | 7.61 | 9.66 | 8.76 | 0.58 | 8.6 | 6.47 | 6.92 |
| ZnO | 0 | 1.87 | 0 | 0 | 0 | 0 | 0 |
| MgO | 7.8 | 7.7 | 9.79 | 6.89 | 9.49 | 7 | 6.54 |
| CaO | 0.03 | 0.03 | 0.03 | 0 | 0 | 0.03 | 0 |
| SRO | 0 | 0 | 0 | 0 | 0 | 0 | 0 |
| BaO | 0.72 | 0 | 0 | 0 | 0 | 0.76 | 0 |
| SnO2 | 0.15 | 0.1 | 0.15 | 0.11 | 0.1 | 0.1 | 0.1 |
| Fe2O3 | 0.06 | 0.06 | 0.06 | 0.02 | 0.02 | 0.02 | 0.02 |
| ZrO2 | 0 | 0 | 0 | 0 | 0 | 0 | 0 |
| R2O/Al2O3 |  |  |  | 2.49 | 16.98 | 5.62 |  |
| (R2O + RO)/Al2O3 |  |  |  | 3.92 | 32.80 | 10.18 |  |
| RO/Al2O3 |  |  |  | 1.44 | 15.82 | 4.56 |  |
| SiO2 + Al2O3 + B2O3 | 82.23 | 80.59 | 80.24 | 81.04 | 80.20 | 82.47 | 84.55 |
| (SiO2 + Al2O3 + B2O3)-RO | 74.40 | 72.86 | 70.42 | 74.15 | 70.71 | 75.44 | 78.01 |
| (SiO2 + Al2O3 + B2O3)-RO-R2O | 65.39 | 63.20 | 60.70 | 62.21 | 60.52 | 65.83 | 69.21 |
| (SiO2 + B2O3)-Al2O3 | 82.23 | 80.59 | 80.24 | 71.44 | 79.00 | 79.05 | 84.55 |
| (SiO2 + B2O3)-Al2O3-R2O | 73.22 | 70.93 | 70.52 | 59.50 | 68.81 | 69.44 | 75.75 |
| (SiO2 + B2O3)-Al2O3-RO | 73.68 | 72.86 | 70.42 | 64.55 | 69.51 | 71.26 | 78.01 |
| R2O-(Al2O3 + B2O3) | 7.31 | 9.66 | 9.72 | 7.14 | 9.59 | 6.27 | 6.28 |
| Strain | 564 | 611 | 647 | 549 | 575 | 563 | 568 |
| anneal | 618 | 673 | 667 | 602 | 636 | 618 | 622 |
| Soft | 866 | 938.2 | 927.2 | 854.7 | 913.4 |  | 863.3 |
| CTE | 67 | 70.2 | 69.9 |  |  | 66.7 | 64.5 |
| density | 2.399 | 2.387 | 2.36 | 2.387 | 2.359 | 2.367 | 2.366 |
| strain (bbv) | 562.3 | 615.3 | 590.4 | 549.8 | 547.9 | 562.4 | 563.1 |
| anneal (bbv) | 615.6 | 671.1 | 647.9 | 600.4 | 632.4 | 615.2 | 615.7 |
| last bbv visc | 12.0295 | 12.0147 | 12.0198 | 12.003 | 12.0212 | 12.0151 | 656.1 |
| last bbv T | 656 | 714.7 | 691.4 | 640.1 | 676.8 | 656.2 | 12.0046 |
| soft (ppv) |  |  |  |  |  |  |  |
| CTE curve (heat) |  |  |  |  |  |  |  |
| CTE curve (cool) |  |  |  |  |  |  |  |
| Poisson |  |  |  |  |  |  |  |
| shear (Mpsi) |  |  |  |  |  |  |  |
| Young's (Mpsi) |  |  |  |  |  |  |  |
| SOC |  |  |  |  |  |  |  |
| nD |  |  |  |  |  |  |  |
| Viscosity |  |  |  |  |  |  |  |
| A | -2.467 | -2.838 | -2.979 | -2.047 | -2.96 | -2.295 | -2.205 |
| B | 7072.677 | 7606.729 | 8077.687 | 6539.143 | 8150.27 | 7063.69 | 6643.2 |
| To | 168.2 | 202.6 | 152.9 | 174.6 | 132.8 | 162.5 | 188.8 |
| T(200P) | 1652 | 1683 | 1683 | 1679 | 1682 | 1699 | 1663 |
| T(400) | 1563 | 1601 | 1600 | 1581 | 1598 | 1605 | 1571 |
| T(35K) | 1177 | 1233 | 1227 | 1167 | 1219 | 1195 | 1173 |
| T(soft) | 747 | 806 | 787 | 728 | 774 | 748 | 744 |
| T(200P)-T(35kP) | 475 | 450 | 456 | 512 | 463 | 504 | 490 |
| 72 hr gradient boat |  |  |  |  |  |  |  |
| air | 1260 | 980 | 1055 | <781 | 1230 | 1050 | 1250 |
| int | 1100 | 955 | 1040 | <781 | <843 | 950 | 1140 |
| Pt | 1085 | 945 | 980 | <781 | <843 | 950 | 1140 |
| liq phase | Unknown | Cristobalite/quartz | Cristobalite | No Devit | No Devit | Cristobalite | cristobalite |
| int liq visc |  |  |  |  |  |  |  |
| T(35kP)-T(liq_int) | 77 | 278 | 187 |  |  | 245 | 33 |

|  | 8 | 9 | 10 | 11 | 12 | 13 | 14 |
|---|---|---|---|---|---|---|---|
| SiO2 | 78.84 | 78.63 | 77.51 | 80.26 | 72.82 | 82.12 | 81.07 |
| Al2O3 | 1.39 | 2.64 | 2.9 | 0.95 | 2.91 | 0 | 0 |
| B2O3 | 0 | 2.56 | 1.28 | 0 | 0.93 | 0 | 1.89 |
| Li2O | 0 | 0 | 0 | 0 | 0 | 0 | 0 |
| Na2O | 1.3 | 2.93 | 4.83 | 0.01 | 0.03 | 0.03 | 0 |
| K2O | 8.54 | 6.19 | 4.78 | 9.78 | 9.37 | 8.92 | 9.16 |
| ZnO | 0 | 0 | 0 | 0 | 0 | 2.53 | 0 |

TABLE 1-continued

|  |  |  |  |  |  |  |  |
|---|---|---|---|---|---|---|---|
| MgO | 9.77 | 5.57 | 3.87 | 8.82 | 5.43 | 6.16 | 7.65 |
| CaO | 0.03 | 0.03 | 3.32 | 0.06 | 4.82 | 0.03 | 0.03 |
| SrO | 0 | 0 | 0 | 0 | 1.59 | 0 | 0 |
| BaO | 0 | 1.33 | 1.41 | 0 | 2 | 0 | 0 |
| SnO2 | 0.1 | 0.1 | 0.1 | 0.1 | 0.1 | 0.15 | 0.15 |
| Fe2O3 | 0.02 | 0.02 | 0 | 0 | 0 | 0.06 | 0.06 |
| ZrO2 | 0 | 0 | 0 | 0.03 | 0 | 0 | 0 |
| R2O/Al2O3 | 7.08 | 3.45 | 3.31 | 10.31 | 3.23 |  |  |
| (R2O + RO)/Al2O3 | 14.13 | 6.08 | 6.28 | 19.65 | 7.99 |  |  |
| RO/Al2O3 | 7.05 | 2.63 | 2.97 | 9.35 | 4.76 |  |  |
| SiO2 + Al2O3 + B2O3 | 80.23 | 83.83 | 81.69 | 81.21 | 76.66 | 82.12 | 82.96 |
| (SiO2 + Al2O3 + B2O3)-RO | 70.43 | 78.23 | 74.50 | 72.33 | 64.82 | 75.93 | 75.28 |
| (SiO2 + Al2O3 + B2O3)-RO-R2O | 60.59 | 69.11 | 64.89 | 62.54 | 55.42 | 66.98 | 66.12 |
| (SiO2 + B2O3)-Al2O3 | 77.45 | 78.55 | 75.89 | 79.31 | 70.84 | 82.12 | 82.96 |
| (SiO2 + B2O3)-Al2O3-R2O | 67.61 | 69.43 | 66.28 | 69.52 | 61.44 | 73.17 | 73.80 |
| (SiO2 + B2O3)-Al2O3-RO | 67.65 | 71.62 | 67.29 | 70.43 | 57.00 | 75.93 | 75.28 |
| R2O-(Al2O3 + B2O3) | 8.45 | 3.92 | 5.43 | 8.84 | 5.56 | 8.95 | 7.27 |
| Strain |  | 558 | 541 | 630 | 596 | 611 | 611 |
| anneal |  | 610 | 590 | 694 | 647 | 672 | 668 |
| Soft |  | 818.2 | 973.4 | 868.7 | 938.6 | 914.6 |  |
| CTE |  | 66 | 70.6 | 69.3 | 77.6 | 65.3 | 66.4 |
| density | 2.359 | 2.418 | 2.46 | 2.352 | 2.541 | 2.389 | 2.363 |
| strain (bbv) | 604.3 | 558 | 540.3 | 630.9 | 597.4 | 607 | 609.8 |
| anneal (bbv) | 662.3 | 609.4 | 588.2 | 689.1 | 647.3 | 664.1 | 663.4 |
| last bbv visc | 12.0012 | 12.0093 | 12.0294 | 12.0253 | 12.0122 | 12.002 | 12.0259 |
| last bbv T | 708.3 | 649.3 | 625.4 | 734.4 | 686.4 | 708 | 704.7 |
| soft (ppv) |  |  |  |  |  |  |  |
| CTE curve (heat) |  |  |  |  |  |  |  |
| CTE curve (cool) |  |  |  |  |  |  |  |
| Poisson | 0.2 |  |  | 0.197 |  |  |  |
| shear (Mpsi) | 3.96 |  |  | 3.8 |  |  |  |
| Young's (Mpsi) | 9.5 |  |  | 9.1 |  |  |  |
| SOC |  |  |  |  |  |  |  |
| nD |  |  |  |  |  |  |  |
| Viscosity |  |  |  |  |  |  |  |
| A | −3.092 | −1.843 | −1.709 | −2.735 | −2.14 | −2.874 | −2.413 |
| B | 8336.899 | 6252.518 | 5692.936 | 7588.096 | 5650.253 | 7902.572 | 6733.483 |
| To | 156 | 197.8 | 210.9 | 220.3 | 287.1 | 176.9 | 238.4 |
| T(200P) | 1702 | 1707 | 1631 | 1727 | 1559 | 1704 | 1667 |
| T(400) | 1620 | 1604 | 1531 | 1642 | 1479 | 1620 | 1581 |
| T(35K) | 1248 | 1177 | 1121 | 1263 | 1132 | 1242 | 1206 |
| T(soft) | 805 | 737 | 707 | 828 | 762 | 802 | 792 |
| T(200P)-T(35kP) | 454 | 530 | 510 | 464 | 427 | 462 | 461 |
| 72 hr gradient boat |  |  |  |  |  |  |  |
| air | 1150 | 935 | 970 | 1135 | 1130 | 1225 | 1130 |
| int | 945 | 915 | 965 | <847 | 975 |  | 1050 |
| Pt | 945 | 905 | 965 | <847 | 975 |  | 1020 |
| liq phase | Unknown | Albite | Forsterite | No Devit | Diopside (K silicate) | Unknown | Cristobalite/quartz |
| int liq visc |  |  |  |  |  |  |  |
| T(35kP)-T(liq_int) | 303 | 262 | 156 | 416 | 157 | 1242 | 156 |

|  | 15 | 16 | 17 | 18 | 19 | 20 | 21 |
|---|---|---|---|---|---|---|---|
| SiO2 | 80.15 | 80.48 | 80.4 | 78.92 | 76.96 | 78.99 | 81.89 |
| Al2O3 | 0 | 0 | 0 | 1.59 | 3.98 | 1.71 | 0 |
| B2O3 | 0 | 0 | 0 | 0 | 0 | 1.56 | 2.71 |
| Li2O | 0 | 0 | 0 | 0 | 0 | 0 | 0 |
| Na2O | 0 | 0 | 0 | 3.87 | 9.28 | 1.46 | 0 |
| K2O | 9.78 | 9.74 | 9.73 | 6.66 | 2.25 | 8 | 8.77 |
| ZnO | 0 | 2.86 | 0.94 | 0 | 0 | 0 | 0 |
| MgO | 9.83 | 6.74 | 8.74 | 8.83 | 7.41 | 7.48 | 6.5 |
| CaO | 0.04 | 0.03 | 0.03 | 0 | 0 | 0.03 | 0 |
| SRO | 0 | 0 | 0 | 0 | 0 | 0 | 0 |
| BaO | 0 | 0 | 0 | 0 | 0 | 0.65 | 0 |
| SnO2 | 0.15 | 0.1 | 0.1 | 0.1 | 0.1 | 0.1 | 0.1 |
| Fe2O3 | 0.06 | 0.06 | 0.06 | 0.02 | 0.02 | 0.02 | 0.02 |
| ZrO2 | 0 | 0 | 0 | 0 | 0 | 0 | 0 |
| R2O/Al2O3 |  |  |  | 6.62 | 2.90 | 5.53 |  |
| (R2O + RO)/Al2O3 |  |  |  | 12.18 | 4.76 | 10.30 |  |
| RO/Al2O3 |  |  |  | 5.55 | 1.86 | 4.77 |  |

TABLE 1-continued

| | | | | | | | |
|---|---|---|---|---|---|---|---|
| SiO2 + Al2O3 + B2O3 | 80.15 | 80.48 | 80.40 | 80.51 | 80.94 | 82.26 | 84.60 |
| (SiO2 + Al2O3 + B2O3)-RO | 70.28 | 73.71 | 71.63 | 71.68 | 73.53 | 74.75 | 78.10 |
| (SiO2 + Al2O3 + B2O3)-RO-R2O | 60.50 | 63.97 | 61.90 | 61.15 | 62.00 | 65.29 | 69.33 |
| (SiO2 + B2O3)-Al2O3 | 80.15 | 80.48 | 80.40 | 77.33 | 72.98 | 78.84 | 84.60 |
| (SiO2 + B2O3)-Al2O3-R2O | 70.37 | 70.74 | 70.67 | 66.80 | 61.45 | 69.38 | 75.83 |
| (SiO2 + B2O3)-Al2O3-RO | 70.28 | 73.71 | 71.63 | 68.50 | 65.57 | 70.68 | 78.10 |
| R2O-(Al2O3 + B2O3) | 9.78 | 9.74 | 9.73 | 8.94 | 7.55 | 6.19 | 6.06 |
| Strain | | 613 | 616 | 553 | 543 | | 608 |
| anneal | | 674 | 678 | 609 | 596 | | 664 |
| Soft | 943 | 935 | 944.4 | 885.4 | 857 | | 908.5 |
| CTE | 70.3 | 70.5 | 69.8 | | | | 64.8 |
| density | 2.358 | 2.404 | 2.371 | 2.367 | 2.383 | 2.366 | 2.362 |
| strain (bbv) | 614.9 | 612 | 614.5 | 550.9 | 542.8 | 588.9 | 610.9 |
| anneal (bbv) | 673 | 668.5 | 672.1 | 606.8 | 594.8 | 643.6 | 664.3 |
| last bbv visc | 12.0347 | 12.0057 | 12.0234 | 12.027 | 12.0159 | 12.0266 | 12.008 |
| last bbv T | 716.8 | 712.2 | 715.9 | 649.6 | 635.2 | 686.1 | 705 |
| soft (ppv) | | | | | | | |
| CTE curve (heat) | | | | | | | |
| CTE curve (cool) | | | | | | | |
| Poisson | | | | | | | |
| shear (Mpsi) | | | | | | | |
| Young's (Mpsi) | | | | | | | |
| SOC | | | | | | | |
| nD | | | | | | | |
| Viscosity | | | | | | | |
| A | −2.995 | −2.766 | −2.828 | −2.705 | −2.221 | −2.326 | −2.138 |
| B | 7911.978 | 7433.453 | 7616.818 | 7816.921 | 6897.122 | 7073.181 | 6347.024 |
| To | 190.5 | 209.1 | 203.2 | 119 | 150.7 | 193.2 | 256.4 |
| T(200P) | 1684 | 1676 | 1688 | 1681 | 1676 | 1722 | 1686 |
| T(400) | 1604 | 1594 | 1606 | 1592 | 1581 | 1628 | 1595 |
| T(35K) | 1240 | 1226 | 1236 | 1197 | 1170 | 1223 | 1206 |
| T(soft) | 811 | 803 | 808 | 746 | 726 | 778 | 790 |
| T(200P)-T(35 kP) | 444 | 450 | 452 | 484 | 506 | 499 | 480 |
| 72 hr gradient boat | | | | | | | |
| air | <850 | 980 | 1060 | <736 | <816 | <840 | 1225 |
| int | <850 | 980 | <834 | <736 | <816 | <840 | 1090 |
| Pt | <850 | 980 | <834 | <736 | <816 | <840 | 1090 |
| liq phase | | Cristobalite/ quartz | Cristobalite | No Devit | No Devit | trace unknown | cristobalite |
| int liq visc | | | | | | | |
| T(35kP)-T(liq_int) | | 246 | 402 | | | 383 | 116 |

| | 22 | 23 | 24 | 25 | 26 | 27 | 28 |
|---|---|---|---|---|---|---|---|
| SiO2 | 79.86 | 79.7 | 74.05 | 78.75 | 80.46 | 80.28 | 80.99 |
| Al2O3 | 1.7 | 0 | 2.91 | 1.7 | 1.95 | 0 | 0 |
| B2O3 | 2.45 | 0 | 1.23 | 0 | 0 | 0 | 0 |
| Li2O | 0 | 0 | 0 | 0 | 0 | 0 | 0 |
| Na2O | 2.95 | 0 | 4.88 | 3.77 | 0.01 | 0.01 | 4.77 |
| K2O | 6.01 | 9.35 | 4.73 | 6.27 | 9.6 | 9.69 | 4.7 |
| ZnO | 0 | 0 | 0 | 0 | 0 | 0 | 2.75 |
| MgO | 5.61 | 10.79 | 5.29 | 9.36 | 7.81 | 9.83 | 6.56 |
| CaO | 0.03 | 0.03 | 4.79 | 0.03 | 0.05 | 0.07 | 0.03 |
| SRO | 0 | 0 | 0.01 | 0 | 0 | 0 | 0 |
| BaO | 1.28 | 0 | 2 | 0 | 0 | 0 | 0 |
| SnO2 | 0.1 | 0.1 | 0.11 | 0.1 | 0.1 | 0.09 | 0.15 |
| Fe2O3 | 0.02 | 0.02 | 0 | 0.02 | 0 | 0 | 0.06 |
| ZrO2 | 0 | 0 | 0 | 0 | 0.03 | 0.03 | 0 |
| R2O/Al2O3 | 5.27 | | 3.30 | 5.91 | 4.93 | | |
| (R2O + RO)/Al2O3 | 9.34 | | 7.46 | 11.43 | 8.96 | | |
| RO/Al2O3 | 4.07 | | 4.15 | 5.52 | 4.03 | | |
| SiO2 + Al2O3 + B2O3 | 84.01 | 79.70 | 78.19 | 80.45 | 82.41 | 80.28 | 80.99 |
| (SiO2 + Al2O3 + B2O3)-RO | 78.37 | 68.88 | 68.10 | 71.06 | 74.55 | 70.38 | 74.40 |
| (SiO2 + Al2O3 + B2O3)-RO-R2O | 69.41 | 59.53 | 58.49 | 61.02 | 64.94 | 60.68 | 64.93 |
| (SiO2 + B2O3)-Al2O3 | 80.61 | 79.70 | 72.37 | 77.05 | 78.51 | 80.28 | 80.99 |
| (SiO2 + B2O3)-Al2O3-R2O | 71.65 | 70.35 | 62.76 | 67.01 | 68.90 | 70.58 | 71.52 |
| (SiO2 + B2O3)-Al2O3-RO | 73.69 | 68.88 | 60.28 | 67.66 | 70.65 | 70.38 | 74.40 |
| R2O-(Al2O3 + B2O3) | 4.81 | 9.35 | 5.47 | 8.34 | 7.66 | 9.70 | 9.47 |

TABLE 1-continued

| | | | | | | | |
|---|---|---|---|---|---|---|---|
| Strain | 553 | | 541 | | 644 | 622 | 536 |
| anneal | 605 | | 588 | | 710 | 686 | 590 |
| Soft | | | 805.3 | | 992.4 | 953.2 | 849 |
| CTE | 65.9 | | 74.2 | | 67.5 | 70.1 | 65.9 |
| density | 2.416 | 2.356 | 2.511 | 2.367 | 2.35 | 2.353 | 2.408 |
| strain (bbv) | 551.9 | 632.5 | 538.9 | 566 | 648.6 | 625.6 | 233.1 |
| anneal (bbv) | 602.8 | 690.6 | 585.6 | 621.4 | 707.8 | 682.7 | 585.1 |
| last bbv visc | 12.0233 | 12.0139 | 12.0311 | 12.0019 | 12.0036 | 12.0132 | 12.0327 |
| last bbv T | 642 | 735.8 | 621.7 | 665.1 | 754.4 | 727.7 | 625.1 |
| soft (ppv) | | | | | | | |
| CTE curve (heat) | | | | | | | |
| CTE curve (cool) | | | | | | | |
| Poisson | | 0.198 | | 0.202 | 0.197 | 0.203 | |
| shear (Mpsi) | | 3.84 | | 4.11 | 3.82 | 3.77 | |
| Young's (Mpsi) | | 9.19 | | 9.88 | 9.14 | 9.07 | |
| SOC | | | | | | | |
| nD | | | | | | | |
| Viscosity | | | | | | | |
| A | −1.986 | −3.071 | −1.876 | −2.687 | −2.895 | −3.052 | −2.454 |
| B | 6365.7 | 7967.918 | 5521.828 | 7778.016 | 8095.232 | 7967.489 | 7148.62 |
| To | 187.6 | 207.6 | 224.4 | 135.6 | 211.1 | 198.9 | 131.8 |
| T(200P) | 1672 | 1691 | 1546 | 1695 | 1769 | 1687 | 1635 |
| T(400) | 1575 | 1612 | 1457 | 1606 | 1684 | 1608 | 1546 |
| T(35K) | 1162 | 1254 | 1084 | 1211 | 1299 | 1248 | 1153 |
| T(soft) | 730 | 829 | 699 | 760 | 851 | 821 | 717 |
| T(200P)-T(35kP) | 510 | 437 | 462 | 484 | 470 | 439 | 482 |
| 72 hr gradient boat | | | | | | | |
| air | 895 | <822 | 1005 | <786 | 900 | 1205 | 1230 |
| int | 895 | <822 | 1000 | <786 | | <821 | 1200 |
| Pt | 880 | <822 | 980 | <786 | | <821 | 1200 |
| liq phase | Cristobalite | No Devit | Diopside | No Devit | No Devit | No Devit | Unknown |
| int liq visc | | | | | | | |
| T(35kP)-T(liq_int) | 267 | | 84 | | 454 | 428 | −47 |

| | 29 | 30 | 31 | 32 | 33 | 34 | 35 |
|---|---|---|---|---|---|---|---|
| SiO2 | 81.57 | 81.58 | 81.18 | 80.03 | 79.93 | 78.61 | 77.81 |
| Al2O3 | 0 | 0 | 0 | 0.13 | 0.9 | 1.74 | 2.88 |
| B2O3 | 1.66 | 1.5 | 1.01 | 0 | 1.6 | 2.39 | 2.75 |
| Li2O | 0 | 0 | 0 | 0 | 0 | 0 | 0 |
| Na2O | 1.39 | 0.91 | 0 | 0.42 | 1.46 | 2.95 | 4.8 |
| K2O | 7.58 | 8.03 | 9.11 | 9.53 | 8.05 | 6.15 | 4.66 |
| ZnO | 0 | 0 | 1.69 | 0 | 0 | 0 | 0 |
| MgO | 6.85 | 7.74 | 6.83 | 9.77 | 7.16 | 6.88 | 3.1 |
| CaO | 0.03 | 0.03 | 0.03 | 0 | 0.03 | 0.03 | 2.77 |
| SRO | 0 | 0 | 0 | 0 | 0 | 0 | 0 |
| BaO | 0.71 | 0 | 0 | 0 | 0.75 | 1.13 | 1.13 |
| SnO2 | 0.15 | 0.15 | 0.08 | 0.1 | 0.1 | 0.1 | 0.1 |
| Fe2O3 | 0.06 | 0.06 | 0.06 | 0.02 | 0.02 | 0.02 | 0 |
| ZrO2 | 0 | 0 | 0 | 0 | 0 | 0 | 0 |
| R2O/Al2O3 | | | | 76.54 | 10.57 | 5.23 | 3.28 |
| (R2O + RO)/Al2O3 | | | | 151.69 | 19.39 | 9.85 | 5.72 |
| RO/Al2O3 | | | | 75.15 | 8.82 | 4.62 | 2.43 |
| SiO2 + Al2O3 + B2O3 | 83.23 | 83.08 | 82.19 | 80.16 | 82.43 | 82.74 | 83.44 |
| (SiO2 + Al2O3 + B2O3)-RO | 76.35 | 75.31 | 75.33 | 70.39 | 75.24 | 75.83 | 77.57 |
| (SiO2 + Al2O3 + B2O3)-RO-R2O | 67.38 | 66.37 | 66.22 | 60.44 | 65.73 | 66.73 | 68.11 |
| (SiO2 + B2O3)-Al2O3 | 83.23 | 83.08 | 82.19 | 79.90 | 80.63 | 79.26 | 77.68 |
| (SiO2 + B2O3)-Al2O3-R2O | 74.26 | 74.14 | 73.08 | 69.95 | 71.12 | 70.16 | 68.22 |
| (SiO2 + B2O3)-Al2O3-RO | 75.64 | 75.31 | 75.33 | 70.13 | 72.69 | 71.22 | 70.68 |
| R2O-(Al2O3 + B2O3) | 7.31 | 7.44 | 8.10 | 9.82 | 7.01 | 4.97 | 3.83 |
| Strain | 559 | 586 | 606 | 600 | | 566 | 540 |
| anneal | 614 | 642 | 666 | 662 | | 620 | 587 |
| Soft | 863.9 | 896.4 | 917.5 | 935.7 | | | 808 |
| CTE | 67.1 | 65.5 | 69 | | | 64.1 | 68.2 |
| density | 2.395 | 2.36 | 2.39 | 2.354 | 2.363 | 2.365 | 2.449 |
| strain (bbv) | 554.9 | 584.1 | 604.5 | 602.8 | 582.1 | 565.4 | 539.3 |
| anneal (bbv) | 607.8 | 638.5 | 660.5 | 661.1 | 636.2 | 618.4 | 586.1 |

TABLE 1-continued

|  |  |  |  |  |  |  |  |
|---|---|---|---|---|---|---|---|
| last bbv visc | 12.021 | 12.0031 | 12.0225 | 12.0238 | 12.0088 | 12.0153 | 12.0055 |
| last bbv T soft (ppv) | 648 | 680.6 | 703.4 | 706.1 | 678.4 | 659.3 | 622.5 |
| CTE curve (heat) |  |  |  |  |  |  |  |
| CTE curve (cool) |  |  |  |  |  |  |  |
| Poisson |  |  |  |  |  |  |  |
| shear (Mpsi) |  |  |  |  |  |  |  |
| Young's (Mpsi) |  |  |  |  |  |  |  |
| SOC |  |  |  |  |  |  |  |
| nD |  |  |  |  |  |  |  |
| Viscosity |  |  |  |  |  |  |  |
| A | −2.34 | −2.386 | −2.634 | −3.057 | −2.324 | −2.059 | −1.453 |
| B | 6842.252 | 6949.189 | 7165.241 | 8100.779 | 6963.842 | 6659.292 | 5228.43 |
| To | 171.6 | 197.7 | 214.7 | 169.1 | 192.6 | 186.1 | 233.7 |
| T(200P) | 1646 | 1680 | 1667 | 1681 | 1698 | 1713 | 1626 |
| T(400) | 1556 | 1591 | 1583 | 1601 | 1606 | 1615 | 1523 |
| T(35K) | 1166 | 1200 | 1213 | 1235 | 1207 | 1195 | 1106 |
| T(soft) | 737 | 770 | 793 | 801 | 769 | 750 | 700 |
| T(200P)-T(35kP) | 480 | 480 | 454 | 446 | 491 | 518 | 520 |
| 72 hr gradient boat |  |  |  |  |  |  |  |
| air | 1250 | 1215 | 1020 | 985 | 980 | 990 | 925 |
| int | 1105 | 1110 | 1020 | <786 | 985 | 990 | 930 |
| Pt | 1100 | 1110 | 1020 | <786 | 990 | 990 | 920 |
| liq phase | Unknown | Cristobalite/quartz | Cristobalite/quartz | No Devit | Cristobalite | Cristobalite | Cristobalite |
| int liq visc |  |  |  |  |  |  |  |
| T(35kP)-T(liq_int) | 61 | 90 | 193 |  | 222 | 205 | 176 |

|  | 36 | 37 | 38 | 39 | 40 | 41 | 42 |
|---|---|---|---|---|---|---|---|
| SiO2 | 72.36 | 80.24 | 80.3 | 80.48 | 79.88 | 81.33 | 78.94 |
| Al2O3 | 2.92 | 1.95 | 0 | 0 | 0.21 | 1.78 | 0.53 |
| B2O3 | 1.25 | 0 | 0 | 0 | 0 | 0.9 | 0 |
| Li2O | 0 | 0 | 0 | 0 | 0 | 0 | 0 |
| Na2O | 4.86 | 2.86 | 4.91 | 0.98 | 0.72 | 0 | 4.18 |
| K2O | 4.75 | 6.87 | 4.86 | 8.75 | 9.32 | 9.23 | 7.55 |
| ZnO | 0 | 0 | 0 | 1.86 | 0 | 0 | 0 |
| MgO | 5.46 | 7.9 | 9.68 | 7.75 | 9.74 | 6.62 | 8.64 |
| CaO | 4.73 | 0.05 | 0.04 | 0.03 | 0 | 0 | 0.03 |
| SRO | 1.58 | 0 | 0 | 0 | 0 | 0 | 0 |
| BaO | 1.99 | 0 | 0 | 0 | 0 | 0 | 0 |
| SnO2 | 0.1 | 0.1 | 0.15 | 0.1 | 0.1 | 0.1 | 0.1 |
| Fe2O3 | 0 | 0 | 0.06 | 0.06 | 0.02 | 0.02 | 0.02 |
| ZrO2 | 0 | 0.03 | 0 | 0 | 0 | 0 | 0 |
| R2O/Al2O3 | 3.29 | 4.99 |  |  | 47.81 | 5.19 | 22.13 |
| (R2O + RO)/Al2O3 | 8.00 | 9.07 |  |  | 94.19 | 8.90 | 38.49 |
| RO/Al2O3 | 4.71 | 4.08 |  |  | 46.38 | 3.72 | 16.36 |
| SiO2 + Al2O3 + B2O3 | 76.53 | 82.19 | 80.30 | 80.48 | 80.09 | 84.01 | 79.47 |
| (SiO2 + Al2O3 + B2O3)-RO | 64.76 | 74.24 | 70.58 | 72.70 | 70.35 | 77.39 | 70.80 |
| (SiO2 + Al2O3 + B2O3)-RO-R2O | 55.15 | 64.51 | 60.81 | 62.97 | 60.31 | 68.16 | 59.07 |
| (SiO2 + B2O3)-Al2O3 | 70.69 | 78.29 | 80.30 | 80.48 | 79.67 | 80.45 | 78.41 |
| (SiO2 + B2O3)-Al2O3-R2O | 61.08 | 68.56 | 70.53 | 70.75 | 69.63 | 71.22 | 66.68 |
| (SiO2 + B2O3)-Al2O3-RO | 56.93 | 70.34 | 70.58 | 72.70 | 69.93 | 73.83 | 69.74 |
| R2O-(Al2O3 + B2O3) | 5.44 | 7.78 | 9.77 | 9.73 | 9.83 | 6.55 | 11.20 |
| Strain | 537 | 577 | 531 | 549 | 592 | 625 |  |
| anneal | 584 | 637 | 587 | 640 | 654 | 687 |  |
| Soft | 795 | 933 | 853 | 907.5 | 930.5 | 960.7 |  |
| CTE | 76.9 | 69.1 | 68.3 | 70.4 |  | 65.5 |  |
| density | 2.56 | 2.356 | 2.365 | 2.39 | 2.356 | 2.35 | 2.37 |
| strain (bbv) | 536.1 | 576.2 | 534.3 | 583.9 | 596.2 | 631.9 | 512.1 |
| anneal (bbv) | 582.1 | 633.6 | 587.3 | 640.1 | 653.2 | 689 | 564.1 |
| last bbv visc | 12.0253 | 12.0103 | 12.0096 | 12.0014 | 12.0269 | 12.0091 | 12.0192 |
| last bbv T soft (ppv) | 617.9 | 678.5 | 627.2 | 684.2 | 697.5 | 732.8 | 604.5 |
| CTE curve (heat) |  |  |  |  |  |  |  |
| CTE curve (cool) |  |  |  |  |  |  |  |
| Poisson |  | 0.184 |  |  |  |  | 0.201 |
| shear (Mpsi) |  | 4.06 |  |  |  |  | 3.96 |
| Young's (Mpsi) |  | 9.69 |  |  |  |  | 9.51 |
| SOC |  |  |  |  |  |  |  |
| nD |  |  |  |  |  |  |  |
| Viscosity |  |  |  |  |  |  |  |

TABLE 1-continued

|  |  |  |  |  |  |  |  |
|---|---|---|---|---|---|---|---|
| A | −1.854 | −2.02 | −2.592 | −2.818 | −3.072 | −2.476 | −2.501 |
| B | 5298.62 | 6432.263 | 7462.031 | 7670.71 | 8209.559 | 7389.733 | 7259.613 |
| To | 236.2 | 220 | 116.2 | 166.6 | 153.8 | 222.6 | 104.6 |
| T(200P) | 1511 | 1709 | 1641 | 1665 | 1682 | 1770 | 1616 |
| T(400) | 1425 | 1612 | 1553 | 1582 | 1601 | 1678 | 1527 |
| T(35K) | 1064 | 1200 | 1162 | 1209 | 1232 | 1275 | 1135 |
| T(soft) | 692 | 766 | 720 | 776 | 794 | 827 | 697 |
| T(200P)-T(35kP) | 447 | 509 | 479 | 456 | 450 | 495 | 481 |
| 72 hr gradient boat |  |  |  |  |  |  |  |
| air | >1245 | <781 | 1210 | 1010 | <756 | 1020 | <812 |
| int | 1015 | <781 | 1145 | 1010 | <756 | 1020 | <812 |
| Pt | 980 | <781 | 1145 | 1005 | <756 | 1015 | <812 |
| liq phase | Diopside | No Devit | Unknown | Cristobalite/quartz | No Devit | unknown | No Devit |
| int liq visc |  |  |  |  |  |  |  |
| T(35kP)-T(liq_int) | 49 | 419 | 17 | 199 |  | 255 |  |

|  | 43 | 44 | 45 | 46 | 47 | 48 | 49 |
|---|---|---|---|---|---|---|---|
| SiO2 | 77.81 | 80.24 | 81.33 | 80.85 | 81.05 | 77.37 | 81.71 |
| Al2O3 | 2.85 | 1.95 | 0 | 0 | 0 | 3.54 | 0.84 |
| B2O3 | 2.77 | 0 | 0 | 1.98 | 1.9 | 0 | 1.73 |
| Li2O | 0 | 0 | 0 | 0 | 0 | 0 | 0 |
| Na2O | 4.85 | 5.84 | 1.97 | 1.89 | 0 | 8.26 | 0 |
| K2O | 4.71 | 3.92 | 8.7 | 7.39 | 9.26 | 3.02 | 9.01 |
| ZnO | 0 | 0 | 0 | 0 | 1.85 | 0 | 0 |
| MgO | 5.74 | 7.88 | 7.76 | 7.65 | 5.76 | 7.68 | 6.58 |
| CaO | 0.03 | 0.05 | 0.03 | 0.03 | 0.02 | 0 | 0 |
| SRO | 0 | 0 | 0 | 0 | 0 | 0 | 0 |
| BaO | 1.13 | 0 | 0 | 0 | 0 | 0 | 0 |
| SnO2 | 0.1 | 0.09 | 0.15 | 0.15 | 0.1 | 0.1 | 0.1 |
| Fe2O3 | 0 | 0 | 0.06 | 0.06 | 0.06 | 0.02 | 0.02 |
| ZrO2 | 0 | 0.03 | 0 | 0 | 0 | 0 | 0 |
| R2O/Al2O3 | 3.35 | 5.01 |  |  |  | 3.19 | 10.73 |
| (R2O + RO)/Al2O3 | 5.78 | 9.07 |  |  |  | 5.36 | 18.56 |
| RO/Al2O3 | 2.42 | 4.07 |  |  |  | 2.17 | 7.83 |
| SiO2 + Al2O3 + B2O3 | 83.43 | 82.19 | 81.33 | 82.83 | 82.95 | 80.91 | 84.28 |
| (SiO2 + Al2O3 + B2O3)-RO | 77.66 | 74.26 | 73.54 | 75.15 | 77.17 | 73.23 | 77.70 |
| (SiO2 + Al2O3 + B2O3)-RO-B2O | 68.10 | 64.50 | 62.87 | 65.87 | 67.91 | 61.95 | 68.69 |
| (SiO2 + B2O3)-Al2O3 | 77.73 | 78.29 | 81.33 | 82.83 | 82.95 | 73.83 | 82.60 |
| (SiO2 + B2O3)-Al2O3-B2O | 68.17 | 68.53 | 70.66 | 73.55 | 73.69 | 62.55 | 73.59 |
| (SiO2 + B2O3)-Al2O3-RO | 70.83 | 70.36 | 73.54 | 75.15 | 77.17 | 66.15 | 76.02 |
| R2O-(Al2O3 + B2O3) | 3.94 | 7.81 | 10.67 | 7.30 | 7.36 | 7.74 | 6.44 |
| Strain | 545 | 552 | 528 | 566 | 605 | 542 | 616 |
| anneal | 594 | 610 | 585 | 620 | 662 | 595 | 674 |
| Soft | 830.2 | 893.4 | 850.8 | 862.3 | 906 | 861.8 | 934.4 |
| CTE | 67.9 | 66.8 |  |  | 67.2 |  | 65.2 |
| density | 2.425 | 2.359 | 2.361 | 2.372 | 2.397 | 2.38 | 2.355 |
| strain (bbv) | 543.6 | 564.6 | 524.4 | 567.9 | 604.9 | 541.3 | 615.8 |
| anneal (bbv) | 591.9 | 614.8 | 579.3 | 620 | 659 | 593.4 | 671.3 |
| last bbv visc | 12.0214 | 12.0076 | 12.0342 | 12.0058 | 12.0213 | 12.0102 | 12.0256 |
| last bbv T | 629.5 | 654 | 620.8 | 659.6 | 700.5 | 634.1 | 714 |
| soft (ppv) |  |  |  |  |  |  |  |
| CTE curve (heat) |  |  |  |  |  |  |  |
| CTE curve (cool) |  |  |  |  |  |  |  |
| Poisson |  | 0.186 |  |  |  |  |  |
| shear (Mpsi) |  | 4.2 |  |  |  |  |  |
| Young's (Mpsi) |  | 9.95 |  |  |  |  |  |
| SOC |  |  |  |  |  |  |  |
| nD |  |  |  |  |  |  |  |
| Viscosity |  |  |  |  |  |  |  |
| A | −1.583 | −2.236 | −2.634 | −2.301 | −2.102 | −2.282 | −2.368 |
| B | 5761.239 | 7082.798 | 7705.419 | 6681.202 | 6169.221 | 7075.248 | 6852.746 |
| To | 206 | 156.8 | 95.6 | 192.7 | 263.9 | 138.9 | 237.9 |
| T(200P) | 1689 | 1718 | 1657 | 1644 | 1665 | 1683 | 1706 |
| T(400) | 1583 | 1621 | 1567 | 1555 | 1575 | 1588 | 1617 |
| T(35K) | 1146 | 1201 | 1169 | 1169 | 1192 | 1175 | 1229 |
| T(soft) | 714 | 747 | 717 | 747 | 784 | 726 | 803 |
| T(200P)-T(35kP) | 543 | 517 | 488 | 475 | 473 | 508 | 477 |
| 72 hr gradient boat |  |  |  |  |  |  |  |
| air | 870 | 1050 | 1210 | 1250 | 1020 | <727 | 1110 |
| int | 860 | 1020 | 1015 | 1070 | 1020 | <727 | 965 |
| Pt | 880 | 1015 | 1015 | 1075 | 1010 | <727 | 965 |

TABLE 1-continued

| | | | | | | | |
|---|---|---|---|---|---|---|---|
| liq phase | Cristobalite | Cristobalite | Cristobalite/ quartz | Cristobalite/ quartz | Cristobalite/ quartz | No Devit | cristobalite |
| int liq visc | | | | | | | |
| T(35kP)-T(liq_int) | 286 | 181 | 154 | 99 | 172 | | 264 |

| | 50 | 51 | 52 | 53 |
|---|---|---|---|---|
| SiO2 | 80.1 | 77.67 | 80.49 | 82.25 |
| Al2O3 | 0.38 | 3.45 | 2.94 | 0 |
| B2O3 | 0 | 0 | 0 | 1.75 |
| Li2O | 0 | 0 | 0 | 0 |
| Na2O | 0 | 7.67 | 0.01 | 1.88 |
| K2O | 10.58 | 3.14 | 9.54 | 8.11 |
| ZnO | 0 | 0 | 0 | 0 |
| MgO | 8.78 | 7.91 | 6.87 | 5.78 |
| CaO | 0.03 | 0.03 | 0.02 | 0.02 |
| SrO | 0 | 0 | 0 | 0 |
| BaO | 0 | 0 | 0 | 0 |
| SnO2 | 0.1 | 0.1 | 0.1 | 0.15 |
| Fe2O3 | 0.02 | 0.02 | 0 | 0.06 |
| ZrO2 | 0 | 0 | 0.03 | 0 |
| R2O/Al2O3 | 27.84 | 3.13 | 3.25 | |
| (R2O + RO)/Al2O3 | 51.03 | 5.43 | 5.59 | |
| RO/Al2O3 | 23.18 | 2.30 | 2.34 | |
| SiO2 + Al2O3 + B2O3 | 80.48 | 81.12 | 83.43 | 84.00 |
| (SiO2 + Al2O3 + B2O3)-RO | 71.67 | 73.18 | 76.54 | 78.20 |
| (SiO2 + Al2O3 + B2O3)-RO-R2O | 61.09 | 62.37 | 66.99 | 68.21 |
| (SiO2 + B2O3)-Al2O3 | 79.72 | 74.22 | 77.55 | 84.00 |
| (SiO2 + B2O3)-Al2O3-R2O | 69.14 | 63.41 | 68.00 | 74.01 |
| (SiO2 + B2O3)-Al2O3-RO | 70.91 | 66.28 | 70.66 | 78.20 |
| R2O-(Al2O3 + B2O3) | 10.20 | 7.36 | 6.61 | 8.24 |
| Strain | | | 653 | 535 |
| anneal | | | 721 | 590 |
| Soft | | | 1013.6 | 835.5 |
| CTE | | | 66.3 | |
| density | 2.356 | 2.372 | 2.347 | 2.369 |
| strain (bbv) | 599.8 | 552 | 658.4 | 535.9 |
| anneal (bbv) | 656.5 | 605 | 719.4 | 588.3 |
| last bbv visc | 12.0187 | 12.0067 | 12.0034 | 12.0284 |
| last bbv T | 700.8 | 646.6 | 767.4 | 628 |
| soft (ppv) | | | | |
| CTE curve (heat) | | | | |
| CTE curve (cool) | | | | |
| Poisson | 0.196 | 0.197 | 0.197 | |
| shear (Mpsi) | 3.72 | 4.24 | 3.86 | |
| Young's (Mpsi) | 8.9 | 10.14 | 9.24 | |
| SOC | | | | |
| nD | | | | |
| Viscosity | | | | |
| A | −2.759 | −2.273 | −2.928 | −2.051 |
| B | 7511.478 | 7130.141 | 8440.123 | 6304.72 |
| To | 201.5 | 147.2 | 202.2 | 180.4 |
| T(200P) | 1686 | 1706 | 1816 | 1629 |
| T(400) | 1603 | 1610 | 1728 | 1535 |
| T(35K) | 1230 | 1193 | 1332 | 1136 |
| T(soft) | 802 | 740 | 867 | 714 |
| T(200P)-T(35kP) | 456 | 513 | 484 | 493 |
| 72 hr gradient boat | | | | |
| air | <817 | 910 | 1145 | 1205 |
| int | <817 | <781 | 925 | 1125 |
| Pt | <817 | <781 | | 1110 |
| liq phase | No Devit | unknown | unknown | Cristobalite/ quartz |
| int liq visc | | | | |
| T(35kP)-T(liq_int) | | | 407 | 11 |

As noted in the above table an exemplary glass article in some embodiments can comprise a glass sheet with a front face having a width and a height, a back face opposite the front face, and a thickness between the front face and back face, forming four edges around the front and back faces, wherein the glass sheet comprises between about 70 mol % to about 85 mol % $SiO_2$, between about 0 mol % to about 5 mol % $Al_2O_3$, between about 0 mol % to about 5 mol % $B_2O_3$, between about 0 mol % to about 10 mol % $Na_2O$, between about 0 mol % to about 12 mol % $K_2O$, between about 0 mol % to about 4 mol % ZnO, between about 3 mol % to about 12 mol % MgO, between about 0 mol % to about 5 mol % CaO, between about 0 mol % to about 3 mol % SrO, between about 0 mol % to about 3 mol % BaO, and between about 0.01 mol % to about 0.5 mol % $SnO_2$.

In other embodiments, the glass article can comprise a glass sheet with a front face having a width and a height, a back face opposite the front face, and a thickness between the front face and back face forming four edges around the front and back faces, wherein the glass sheet comprises greater than about 80 mol % $SiO_2$, between about 0 mol % to about 0.5 mol % $Al_2O_3$, between about 0 mol % to about 0.5 mol % $B_2O_3$, between about 0 mol % to about 0.5 mol % $Na_2O$, between about 8 mol % to about 11 mol % $K_2O$, between about 0.01 mol % to about 4 mol % ZnO, between about 6 mol % to about 10 mol % MgO, between about 0 mol % to about 0.5 mol % CaO, between about 0 mol % to about 0.5 mol % SrO, between about 0 mol % to about 0.5 mol % BaO, and between about 0.01 mol % to about 0.11 mol % $SnO_2$.

In further embodiments, the glass article can comprise a glass sheet with a front face having a width and a height, a back face opposite the front face, and a thickness between the front face and back face forming four edges around the front and back faces, wherein the glass sheet is substantially free of $Al_2O_3$ and $B_2O_3$ and comprises greater than about 80 mol % $SiO_2$, between about 0 mol % to about 0.5 mol % $Na_2O$, between about 8 mol % to about 11 mol % $K_2O$, between about 0.01 mol % to about 4 mol % ZnO, between about 6 mol % to about 10 mol % MgO, and between about 0.01 mol % to about 0.11 mol % $SnO_2$. In some embodiments, the glass sheet is substantially free of $B_2O_3$, $Na_2O$, CaO, SrO, or BaO, and combinations thereof.

In additional embodiments, the glass article can comprise a glass sheet with a front face having a width and a height, a back face opposite the front face, and a thickness between the front face and back face forming four edges around the front and back faces, wherein the glass sheet comprises an alumina free, potassium silicate composition comprising greater than about 80 mol % $SiO_2$, between about 8 mol % to about 11 mol % $K_2O$, between about 0.01 mol % to about 4 mol % ZnO, between about 6 mol % to about 10 mol % MgO, and between about 0.01 mol % to about 0.11 mol % $SnO_2$. In some embodiments, the glass sheet is substantially free of $B_2O_3$, $Na_2O$, CaO, SrO, or BaO, and combinations thereof.

In some embodiments, the glass article can comprise a glass sheet with a front face having a width and a height, a back face opposite the front face, and a thickness between the front face and back face forming four edges around the front and back faces, wherein the glass sheet comprises between about 72.82 mol % to about 82.03 mol % $SiO_2$, between about 0 mol % to about 4.8 mol % $Al_2O_3$, between about 0 mol % to about 2.77 mol % $B_2O_3$, between about 0 mol % to about 9.28 mol % $Na_2O$, between about 0.58 mol % to about 10.58 mol % $K_2O$, between about 0 mol % to about 2.93 mol % ZnO, between about 3.1 mol % to about 10.58 mol % MgO, between about 0 mol % to about 4.82 mol % CaO, between about 0 mol % to about 1.59 mol % SrO, between about 0 mol % to about 3 mol % BaO, and between about 0.08 mol % to about 0.15 mol % $SnO_2$. In further embodiments, the glass sheet is substantially free of $Al_2O_3$, $B_2O_3$, $Na_2O$, CaO, SrO, or BaO, and combinations thereof.

In further embodiments, the glass article can comprise a glass sheet with a front face having a width and a height, a back face opposite the front face, and a thickness between the front face and back face forming four edges around the front and back faces, wherein the glass sheet is substantially free of $Al_2O_3$ and $B_2O_3$ and comprises greater than about 80 mol % $SiO_2$, and wherein the glass has a color shift <0.005. In some embodiments, the glass sheet comprises between about 8 mol % to about 11 mol % $K_2O$, between about 0.01 mol % to about 4 mol % ZnO, between about 6 mol % to about 10 mol % MgO, and between about 0.01 mol % to about 0.11 mol % $SnO_2$.

In additional embodiments, the glass article can comprise a glass sheet with a front face having a width and a height, a back face opposite the front face, and a thickness between the front face and back face forming four edges around the front and back faces, wherein the glass sheet is substantially free of $Al_2O_3$, $B_2O_3$, $Na_2O$, CaO, SrO, and BaO, and wherein the glass has a color shift <0.005. In some embodiments, the glass sheet comprises greater than about 80 mol % $SiO_2$. In some embodiments, the glass sheet comprises between about 8 mol % to about 11 mol % $K_2O$, between about 0.01 mol % to about 4 mol % ZnO, between about 6 mol % to about 10 mol % MgO, and between about 0.01 mol % to about 0.11 mol % $SnO_2$.

In any of the aforementioned embodiments, the glass has a color shift <0.008 or <0.005. In some embodiments, the glass has a strain temperature between about 512° C. and 653° C. In further embodiments, the glass has an annealing temperature between about 564° C. and 721° C. In additional embodiments, the glass has a softening temperature between about 795° C. and 1013° C. In some embodiments, the glass has a CTE between about 64×10−7/° C. to about 77×10−7/° C. In further embodiments, the glass has a density between about 2.34 gm/cc @ 20 C and about 2.56 gm/cc @ 20 C. In yet additional embodiments, the glass article is a light guide plate having a thickness between about 0.2 mm and about 8 mm. Such a light guide plate may be manufactured from a fusion draw process, slot draw process, or a float process. In further embodiments, the glass comprises less than 1 ppm each of Co, Ni, and Cr. In some embodiments, the concentration of Fe is <about 20 ppm or <about 10 ppm. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In further embodiments, the glass sheet is chemically strengthened. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a ring" includes examples having two or more such rings unless the context clearly indicates otherwise. Likewise, a "plurality" or an "array" is intended to denote "more than one." As such, a "plurality of droplets" includes two or more such droplets, such as three or more such droplets, etc., and an "array of rings" comprises two or more such droplets, such as three or more such rings, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A glass article, comprising:
a glass sheet with a front face having a width and a height, a back face opposite the front face, and a thickness between the front face and back face forming four edges around the front and back faces,
wherein the glass sheet comprises:
from 72.82 mol % to about 85 mol % $SiO_2$,
from 0 mol % to 5 mol % $Al_2O_3$,
from 0 mol % to about 5 mol % $B_2O_3$,
between 0 mol % to about 10 mol % $Na_2O$,
from above 0 mol % to about 12 mol % $K_2O$,
from 0 mol % to about 4 mol % ZnO,
from about 3 mol % to about 12 mol % MgO,
from 0 mol % to about 5 mol % CaO,
from 0 mol % to about 3 mol % SrO,
from 0 mol % to about 3 mol % BaO, and
from about 0.01 mol % to about 0.5 mol % $SnO_2$.

2. A glass article, comprising:
a glass sheet with a front face having a width and a height, a back face opposite the front face, and a thickness between the front face and back face forming four edges around the front and back faces,
wherein the glass sheet comprises:
from 72.82 mol % to about 82.03 mol % $SiO_2$,
from 0 mol % to 4.8 mol % $Al_2O_3$,
from 0 mol % to about 2.77 mol % $B_2O_3$,
from 0 mol % to about 9.28 mol % $Na_2O$,
from about 0.58 mol % to about 10.58 mol % $K_2O$,
from 0 mol % to about 2.93 mol % ZnO,
from about 3.1 mol % to about 10.58 mol % MgO,
from 0 mol % to about 4.82 mol % CaO,
from 0 mol % to about 1.59 mol % SrO,
from 0 mol % to about 3 mol % BaO, and
from about 0.08 mol % to about 0.15 mol % $SnO_2$.

3. The glass article of claim 2, wherein the glass sheet is substantially free of $Al_2O_3$, $B_2O_3$, $Na_2O$, CaO, SrO, or BaO, and combinations thereof.

4. The glass article of claim 2, wherein the glass has a color shift <0.008.

5. The glass article of claim 2, wherein the glass has a color shift <0.005.

6. The glass article of claim 2, wherein the glass has a strain temperature between about 512° C. and 653° C.

7. The glass article of claim 2, wherein the glass has an annealing temperature between about 564° C. and 721° C.

8. The glass article of claim 2, wherein the glass has a softening temperature between about 795° C. and 1013° C.

9. The glass article of claim 2, wherein the glass has a CTE between about 64×10-7/° C. to about 77×10-7/° C.

10. The glass article of claim 2, wherein the glass has a density between about 2.34 gm/cc @ 20 C and about 2.56 gm/cc @ 20 C.

11. The glass article of claim 2, wherein the glass article is a light guide plate.

12. The glass article of claim 11, wherein the thickness of the plate is between about 0.2 mm and about 8 mm.

13. The glass article of claim 11, wherein the light guide plate is manufactured from a fusion draw process, slot draw process, or a float process.

14. The glass article of claim 2, wherein the glass comprises less than 1 ppm each of Co, Ni, and Cr.

15. The glass article of claim 2, wherein the concentration of Fe is <about 20 ppm.

16. The glass article of claim 2, wherein the concentration of Fe is <about 10 ppm.

17. The glass article of claim 2, wherein the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof.

18. The glass article of claim 2, wherein the glass sheet is chemically strengthened.

19. The glass article of claim 18, wherein the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

20. The glass article of claim 2, wherein the glass sheet is substantially free of $Al_2O_3$.

* * * * *